United States Patent
Stand et al.

(10) Patent No.: US 9,624,429 B2
(45) Date of Patent: Apr. 18, 2017

(54) TERNARY METAL HALIDE SCINTILLATORS

(71) Applicant: University of Tennessee Research Foundation, Knoxville, TN (US)

(72) Inventors: Luis Stand, Knoxville, TN (US); Mariya Zhuravleva, Knoxville, TN (US); Charles L. Melcher, Oak Ridge, TN (US)

(73) Assignee: University of Tennessee Research Foundation, Knoxville, TN (US)

( * ) Notice: Subject to any disclaimer, the term of this patent is extended or adjusted under 35 U.S.C. 154(b) by 0 days.

(21) Appl. No.: 14/906,199

(22) PCT Filed: Jul. 18, 2014

(86) PCT No.: PCT/US2014/047248
§ 371 (c)(1),
(2) Date: Jan. 19, 2016

(87) PCT Pub. No.: WO2015/010055
PCT Pub. Date: Jan. 22, 2015

(65) Prior Publication Data
US 2016/0168458 A1    Jun. 16, 2016

Related U.S. Application Data

(60) Provisional application No. 61/856,393, filed on Jul. 19, 2013.

(51) Int. Cl.
*C09K 11/77* (2006.01)
*G21K 4/00* (2006.01)
(Continued)

(52) U.S. Cl.
CPC ........ *C09K 11/7733* (2013.01); *G01T 1/2006* (2013.01); *G01T 1/2023* (2013.01); *G21K 4/00* (2013.01); *G21K 2004/10* (2013.01)

(58) Field of Classification Search
CPC ....... G01T 1/2023; G01T 1/202; G01T 1/306; G21K 4/00
See application file for complete search history.

(56) References Cited

U.S. PATENT DOCUMENTS 5,882,548 A    3/1999  Liang et al.
7,651,632 B2   1/2010  Ferrand et al.
(Continued)

FOREIGN PATENT DOCUMENTS

CN    103224786 A    7/2013
EP     2387040 A2   11/2011
(Continued)

OTHER PUBLICATIONS

Notification of Transmittal of International Preliminary Report on Patentability (Chapter II of the Patent Coopertation Treaty) corresponding to PCT/US2014/047248 mailed on Jul. 20, 2015.
(Continued)

*Primary Examiner* — David Porta
*Assistant Examiner* — Faye Boosalis
(74) *Attorney, Agent, or Firm* — Jenkins, Wilson, Taylor & Hunt

(57) ABSTRACT

Metal halide scintillators are described. More particularly, the scintillators include doped (e.g., europium-doped) ternary metal halides, such as those of the formulas $A_2BX_4$ and $AB_2X_5$, wherein A is an alkali metal, such as Li, Na, K, Rb, Cs or any combination thereof; B is an alkali earth metal, such as Be, Mg, Ca, Sr, Ba or any combination thereof; and X is a halide, such as Cl, Br, I, F or any combination thereof. Radiation detectors comprising the novel metal halide scintillators and other ternary metal halides, such as those of the formulas $A_2EuX_4$ and $AEu_2X_5$, wherein A is an alkali metal and X is a halide, are also described.

48 Claims, 28 Drawing Sheets

(51) Int. Cl.
  *G01T 1/20* (2006.01)
  *G01T 1/202* (2006.01)

(56) References Cited

U.S. PATENT DOCUMENTS

| | | |
|---|---|---|
| 8,496,851 B2 | 7/2013 | Seitz et al. |
| 8,575,553 B1 | 11/2013 | Shah et al. |
| 8,580,149 B2 | 11/2013 | Payne et al. |
| 8,598,530 B2 | 12/2013 | Zhuravleva et al. |
| 2010/0078595 A1 | 4/2010 | Eriksson et al. |
| 2011/0260107 A1 | 10/2011 | Spurrier et al. |
| 2012/0193539 A1 | 8/2012 | Bizarri et al. |
| 2015/0353822 A1 | 12/2015 | Tyagi et al. |
| 2016/0124094 A1 | 5/2016 | Melcher et al. |

FOREIGN PATENT DOCUMENTS

| | | |
|---|---|---|
| WO | WO 2014/171985 A2 | 10/2014 |
| WO | WO 2014/201234 A1 | 12/2014 |
| WO | WO 2015/010055 A1 | 1/2015 |

OTHER PUBLICATIONS

Notification of Transmittal of the International Search Report and the Written Opinion of the International Searching Authority, or the Declaration corresponding to PCT/US2014/047248 mailed on Nov. 18, 2014.

Van Loef, E.V. et al., "Crystal Growth and Scintillation Properties of Strontium Iodide Scintillators," IEEE Transactions on Nuclear Science, NS-56, 869-872 (Feb. 26, 2010).

Bourett-Courchesne et al., "Eu2+-doped Ba2CsI5, a new high-performance scintillator," Nuclear Instruments and Methods in Physics Research A 612, pp. 138-142 (2009).

Official Action corresponding to Chinese Patent Application No. 2014800408540 dated Jan. 3, 2017 (translation included).

Bukhalova et al., "The K, Rb, Sr Cl System," Russ J. Inorg. Chem. (English Translation), vol. 12, No. 5, pp. 703-705 (May 1967).

Fink et al., "Über die Systeme des Europium(II)- und Strontiumchlorids mit Alkalimetallchloriden und Thalliumchlroid," Z. Anorg. Allg. Chem., vol. 466, pp. 87-96 (1980).

Kellner, "Die binaren Systeme aus den Bromiden der Alkali- und Erdalkalimetalle," Z. Anorg. Allg. Chem., vol. 37, pp. 137-187 (1913).

Korshunov et al., "Reaction of Europium(III) and Terbium Chlorides with Sodium and Potassium Chlorides,"Russ. J. Inorg. Chem. (English translation), vol. 11, No. 5, pp. 547-550 (May 1966).

Riccardi et al., "Binary Systems Formed by Alkali Bromides with Barium or Strontium Bromide," Z. Naturforsch A: Astrophys., Phys. Phys., Chem., vol. 25, pp. 781-785 (Mar. 1970).

Schilling et al., "Ternäre Bromide und Iodid zweiwertiger Lanthanide und ihre Erdalkali-Anloga vom Typ AMX3 und AM2X5," Z. Anorg. Allg., vol. 622, pp. 759-765 (1996).

Wei, "Effect of Ba Substitution in CsSrI3:Eu2+," Journal of Crystal Growth, vol. 384, pp. 27-32 (2013).

Yamaji et al., "Crystal Growth and Scintillation Properties of Ce and Eu doped LiSrAlF6," Nuclear Instruments and Methods in Pysics Research A, vol. 659, pp. 368-372 (2011).

Yang et al., "Optical and Scintillation Properties of Single Crystal CsSr1-xEuxI3," IEEE Nuclear Science Symposium Conference Record (NSS/MIC), pp. 1603-1606 (2010).

Yang et al., "Crystal Growth and Scintillation Properties of Cs3EuI5 Crystals,"vol. 318, pp. 833-835 (2011).

Zhuraveva et al., "Crystal Growth and Scintillation Properties of Cs3CeCl6 and CsCe2Cl7," vol. 318, pp. 809-812 (2011).

Zhuravleva et al., "New Single Crystal Scintillators; CsCaCl3:Eu and CsCaI3:Eu,"Journal of Crystal Growth, vol. 352, pp. 115-119 (2012).

TERNARY METAL HALIDE SCINTILLATORS

RELATED APPLICATIONS

The presently disclosed subject matter is based on and claims the benefit of U.S. Provisional Patent Application Ser. No. 61/856,393, filed Jul. 19, 2013; the disclosure of which is incorporated herein by reference in its entirety.

TECHNICAL FIELD

The presently disclosed subject matter relates to ternary metal halide scintillator materials, such as europium-containing ternary metal halide scintillator materials. The presently disclosed subject matter further relates to radiation detectors comprising the scintillator materials, to methods of using the scintillator materials to detect radiation, and to methods of preparing the scintillator materials.

ABBREVIATIONS

%=percentage
° C.=degrees Celsius
µs=microseconds
Ba=barium
Be=beryllium
Br=bromide
Ca=calcium
Ce=cerium
Cl=chloride
Cs=cesium
cm=centimeter
CT=computed tomography
Eu=europium
F=fluoride
g=grams
I=iodide
In=indium
K=potassium
Li=lithium
LO=light output
MeV=megaelectronvolt
Mg=magnesium
Na=sodium
nm=nanometer
ns=nanoseconds
PET=positron emission tomography
ph=photons
PL=photoluminescence
PMT=photomultiplier tube
Pr=praseodymium
Rb=rubidium
RL=radioluminescence
RT=room temperature
SPECT=single photon emission computed tomography
Sr=strontium
Tb=terbium
Tl=thallium
TL=thermoluminescence
Yb=ytterbium

BACKGROUND

Scintillator materials, which emit light pulses in response to impinging radiation, such as X-rays, gamma rays and thermal neutron radiation, are used in detectors that have a wide range of applications in medical imaging, particle physics, geological exploration, security and other related areas. Considerations in selecting scintillator materials typically include, but are not limited to, luminosity, decay time, and emission wavelength.

While a variety of scintillator materials have been made, there is a continuous need for additional scintillator materials, e.g., to meet one or more particular needs of different applications.

SUMMARY

In some embodiments, the presently disclosed subject matter provides a scintillator material comprising one of Formulas (I), (II), (III), (IV), (V), or (VI): $A_2B_{(1-y)}L_yX_4$ (I); $AB_{2(1-y)}L_{2y}X_5$ (II); $A'_{2(1-y)}L'_{2y}BX_4$ (III); $A'_{(1-y)}L'_yB_2X_5$ (IV); $A''_{2(1-y)}L''_{2y}BX_4$ (V); or $A''_{(1-y)}L''_yB_2X_5$ (VI); wherein: $0.0001 \leq y \leq 0.5$; A is one or more alkali metal; A' is one or more of the group comprising Li, K, Rb, and Cs; A'' is Na or a combination of Na and one or more additional alkali metal; B is one or more alkali earth metal; L is selected from the group comprising Eu, Ce, Tb, Yb, and Pr; L' is selected from the group comprising Tl, In, and Na; L'' is selected from the group comprising Tl and In; and X is one or more halide.

In some embodiments, A or A' is selected from K, Rb, and Cs. In some embodiments, B is selected from Sr and Ba. In some embodiments, X is selected from Cl, Br, and I. In some embodiments, L is Eu and the scintillator material is $A_2B_{(1-y)}Eu_yX_4$ or $AB_{2(1-y)}Eu_{2y}X_5$. In some embodiments, $0.01 \leq y \leq 0.1$. In some embodiments, $0.025 \leq y \leq 0.05$.

In some embodiments, the scintillator material comprises $A_2B_{0.95}Eu_{0.05}X_4$ or $AB_{2(0.975)}Eu_{2(0.025)}X_5$. In some embodiments, the scintillator material is selected from the group comprising $K_2BaI_4$:Eu 5%; $K_2BaBr_4$:Eu 5%; $Rb_2BaCl_4$:Eu 5%; $K_2SrBr_4$:Eu 5%; $Rb_2BaCl_4$:Eu 2.5%; $RbSr_2Cl_5$:Eu 2.5%; $KSr_2Br_5$:Eu 2.5%; $KBa_2I_5$:Eu 2.5%; $CsSr_2I_5$:Eu 2.5%; $RbBa_2Br_5$:Eu 2.5%; $RbSr_2Br_5$:Eu 2.5%; $KSr_2I_5$:Eu 4%; and $KSr_2I_5$:Eu 2.5%.

In some embodiments, the presently disclosed subject matter provides a radiation detector comprising a photon detector and a scintillation material, wherein the scintillation material comprises one of Formulas (I), (II), (III), (IV), (V), or (VI). In some embodiments, the detector is a medical diagnostic device, a device for oil exploration, or a device for container or baggage scanning. In some embodiments, the presently disclosed subject matter provides a method of detecting gamma rays, X-rays, cosmic rays, and/or particles having an energy of 1 keV or greater, the method comprising using the radiation detector comprising the photon detector and the scintillation material of one of Formulas (I), (II), (III), (IV), (V), or (VI).

In some embodiments, the presently disclosed subject matter provides a radiation detector comprising a photon detector and a scintillation material, wherein the scintillation material comprises one of Formulas (I'), (II'), (III'), (IV'), (V') or (VI'): $A_2B_{(1-z)}L_zX_4$ (I'); $AB_{2(1-z)}L_{2z}X_5$ (II'); $A'_{2(1-z)}L'_{2z}BX_4$ (III'); $A'_{1-z}L'_zB_2X_5$ (IV'); $A''_{2(1-z)}L''_{2z}BX_4$ (V'); or $A''_{(1-z)}L''_zB_2X_5$ (VI'); wherein: $0.0001 \leq z \leq 1.0$; A is one or more alkali metal; A' is one or more of the group comprising Li, K, Rb, and Cs; A'' is Na or a combination of Na and one or more additional alkali metal; B is one or more alkali earth metal; L is selected from Eu, Ce, Tb, Yb, and Pr; L' is selected from Tl, In, and Na; L'' is selected from Tl and In; and X is one or more halide. In some embodiments, A or A' is selected from K, Rb, and Cs. In some embodiments, B is selected from Sr and Ba. In some embodiments, X is selected from Cl, Br, and I. In some embodiments, L is Eu and the scintillator material comprises $A_2B_{(1-z)}Eu_zX_4$ or $AB_{2(1-z)}Eu_{2z}X_5$.

In some embodiments, $0.01 \leq z \leq 0.1$. In some embodiments, $0.025 \leq z \leq 0.05$. In some embodiments, the scintillation material comprises $A_2B_{0.95}Eu_{0.05}X_4$ or $AB_{2(0.975)}Eu_{2(0.025)}X_5$. In some embodiments, the scintillation material is selected from the group comprising $K_2BaI_4$:Eu 5%; $K_2BaBr_4$:Eu 5%; $Rb_2BaCl_4$:Eu 5%; $K_2SrBr_4$:Eu 5%; $Rb_2BaCl_4$:Eu 2.5%; $RbSr_2Cl_5$:Eu 2.5%; $KSr_2Br_5$:Eu 2.5%; $KBa_2I_5$:Eu 2.5%; $CsSr_2I_5$:Eu 2.5%; $RbBa_2Br_5$:Eu 2.5%; $RbSr_2Br_5$:Eu 2.5%; $KSr_2I_5$:Eu 4%; and $KSr_2I_5$:Eu 2.5%.

In some embodiments, z is 1. In some embodiments, the scintillation material is $K_2EuCl_4$ or $RbEu_2Cl_5$.

In some embodiments, the detector is a medical diagnostic device, a device for oil exploration, or a device for container or baggage scanning. In some embodiments, the presently disclosed subject matter provides a method of detecting gamma rays, X-rays, cosmic rays, and/or particles having an energy of 1 keV or greater, the method comprising using the radiation detector.

In some embodiments, the presently disclosed subject matter provides a method of preparing a scintillator material comprising one of Formulas (I), (II), (III), (IV), (V), or (VI) wherein the method comprises heating a mixture of raw materials above their respective melting temperatures. In some embodiments, the method comprises: (a) providing a mixture of raw materials, wherein the raw materials are provided in a stoichiometric ratio according to one of Formulas (I), (II), (III), (IV), (V), or (VI); (b) sealing said mixture in a sealed container; (c) heating the mixture to about 20° C. above the melting point of the raw material having the highest melting point for a period of time; (d) cooling the mixture to about room temperature; and (e) optionally repeating steps (c) and (d). In some embodiments, the scintillator material is prepared in polycrystalline form.

Accordingly, it is an object of the presently disclosed subject matter to provide ternary metal halide scintillator materials and radiation detectors comprising ternary metal halide scintillator materials; methods of detecting gamma rays, X-rays, cosmic rays and/or particles having an energy of 1 keV or greater with the radiation detectors; and methods of preparing the scintillator materials.

An object of the presently disclosed subject matter having been stated hereinabove, and which is achieved in whole or in part by the presently disclosed subject matter, other objects will become evident as the description proceeds herein below.

DETAILED DESCRIPTION

Figure 1:
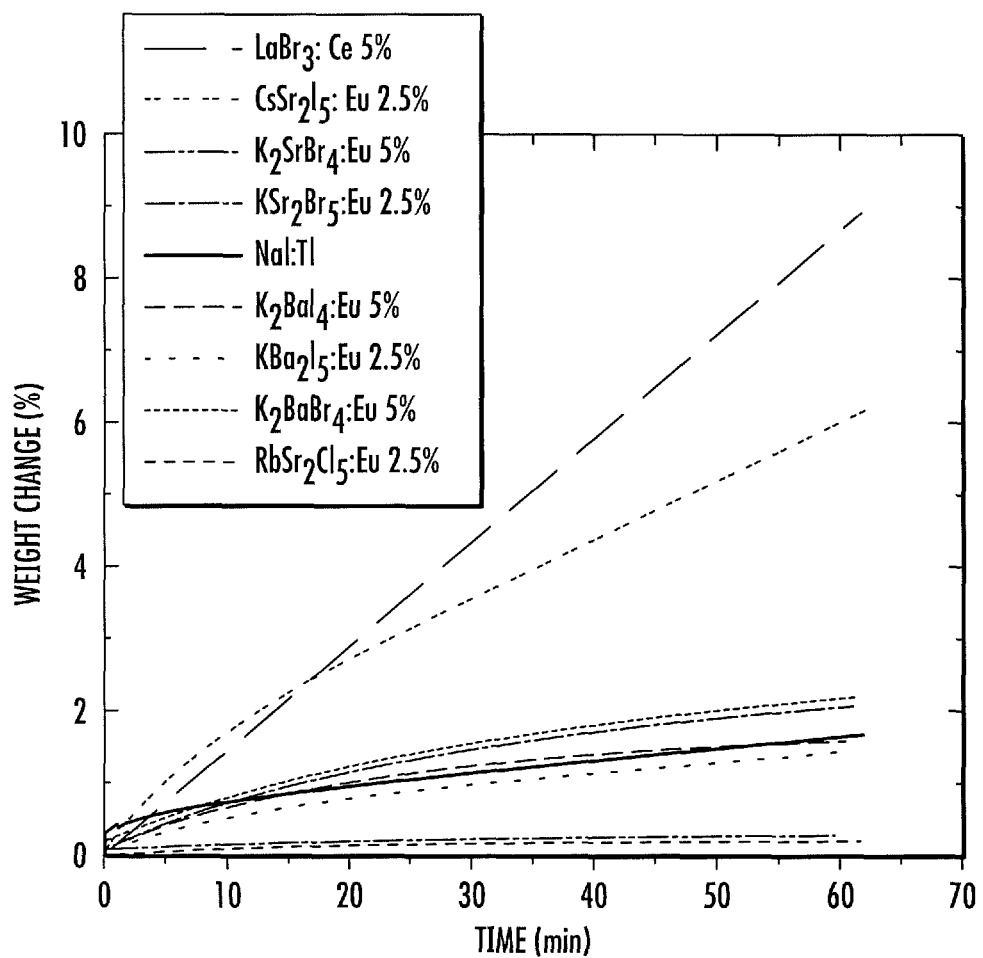
FIG. 1 is a graph showing the moisture intake curves (at 25° C. and 40% relative humidity) for scintillation materials of the presently disclosed subject matter. The materials include $CsSr_2I_5$: Eu 2.5% (— — —); $K_2SrBr_4$: Eu 5% (— - - —); $KSr_2Br_5$: Eu 2.5% (— - — -); $K_2BaI_4$: Eu 5% (- — —); $KBa_2I_5$: Eu 2.5% (- - - -); $K_2BaBr_4$: Eu 5% ( . . . ) and $RbSr_2Cl_5$: Eu 2.5% (- - - ). The moisture intake curves for 5 atomic % cerium activated lanthanum tribromide ($LaBr_3$:Ce 5%, (— —)) and thallium activated sodium iodide (NaI: Tl, (—)) are also shown, for comparison.
Figure 2A:
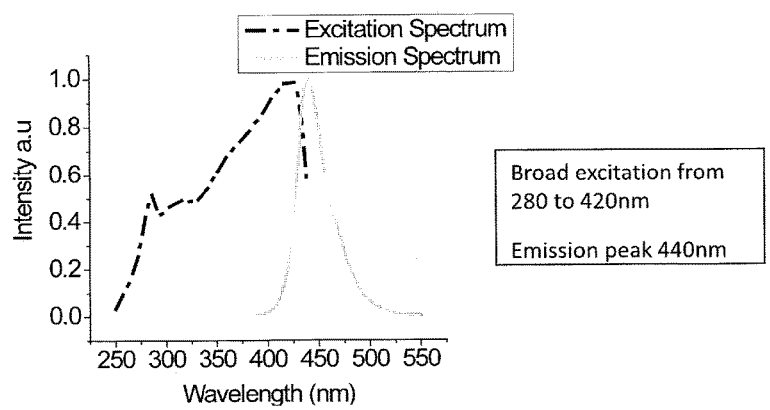
FIG. 2A is a graph showing the photoluminescence emission (solid line) and excitation (broken line) spectra of 5 atomic % europium activated potassium barium iodide ($K_2BaI_4$:Eu 5%). There is a broad excitation range from about 280 nanometers (nm) to about 420 nm and an emission peak at 440 nm.
Figure 2B:
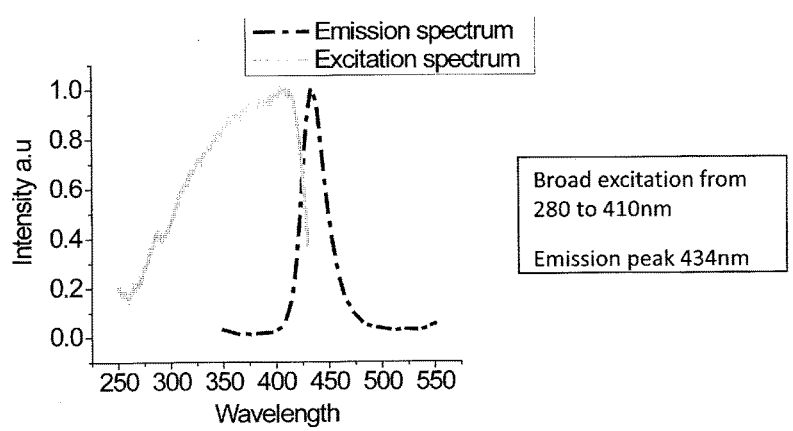
FIG. 2B is a graph showing the photoluminescence emission (broken line) and excitation (solid line) spectra of 5 atomic % europium activated potassium barium bromide ($K_2BaBr_4$:Eu 5%). There is a broad excitation range from about 280 nanometers (nm) to about 410 nm and an emission peak at 434 nm.
Figure 2C:
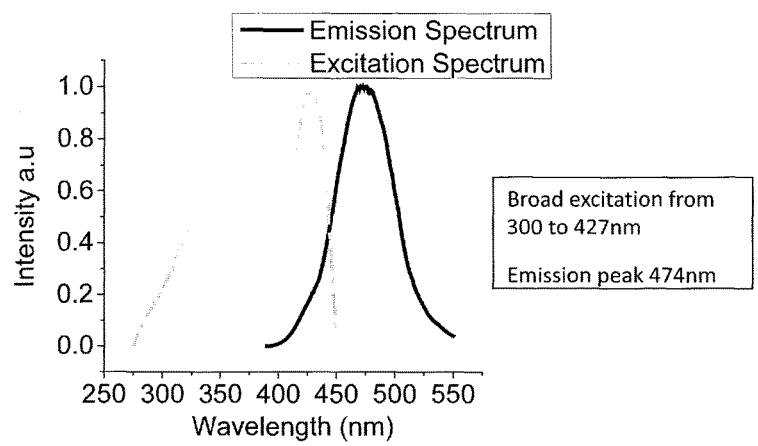
FIG. 2C is a graph showing the photoluminescence emission (solid line) and excitation (broken line) spectra of potassium europium chloride ($K_2EuCl_4$). There is a broad excitation range from about 300 nanometers (nm) to about 427 nm and an emission peak at 474 nm.
Figure 2D:
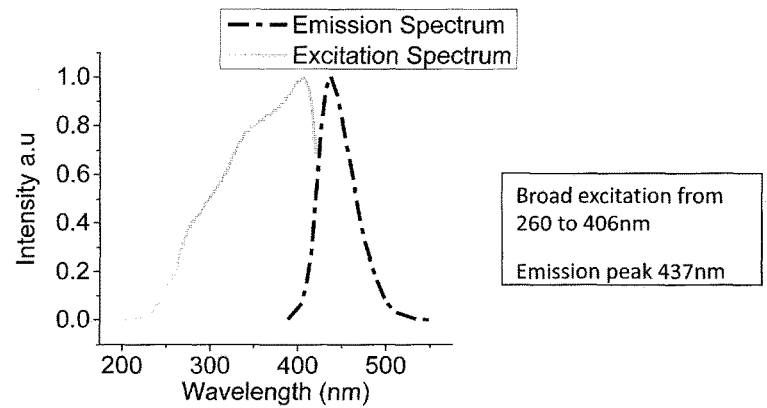
FIG. 2D is a graph showing the photoluminescence emission (broken line) and excitation (solid line) spectra of 2.5 atomic % europium activated rubidium barium chloride ($Rb_2BaCl_4$:Eu 2.5%). There is a broad excitation range from about 260 nanometers (nm) to about 406 nm and an emission peak at 437 nm.
Figure 2E:
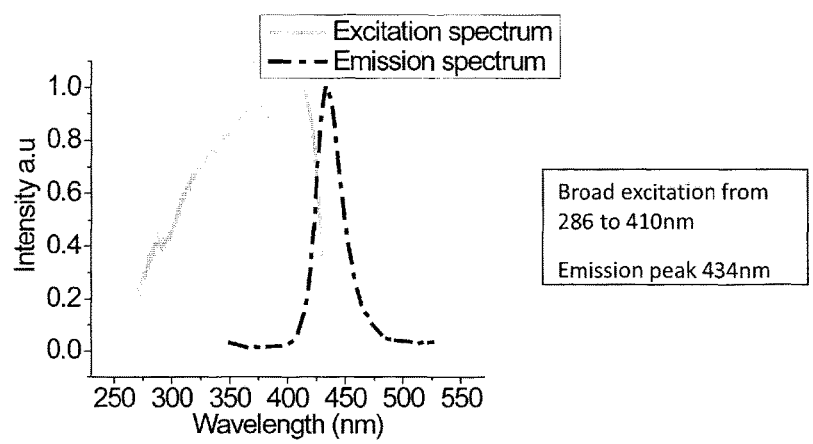
FIG. 2E is a graph showing the photoluminescence emission (broken line) and excitation (solid line) spectra of 5 atomic % europium activated potassium strontium bromide ($K_2SrBr_4$:Eu 5%). There is a broad excitation range from about 286 nanometers (nm) to about 410 nm and an emission peak at 434 nm.
Figure 2F:
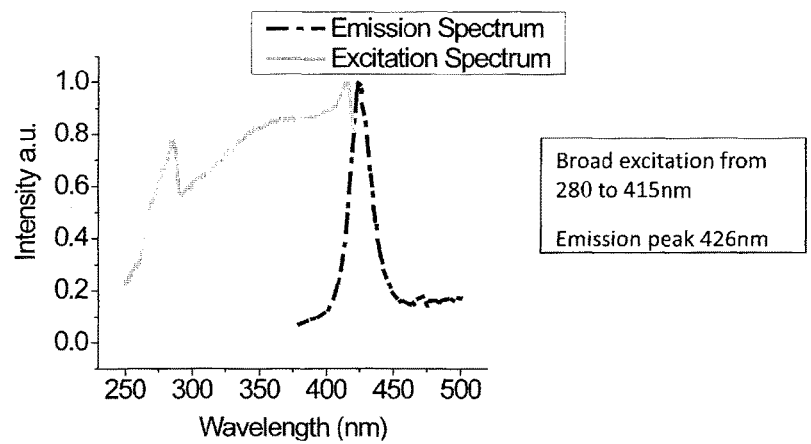
FIG. 2F is a graph showing the photoluminescence emission (broken line) and excitation (solid line) spectra of 2.5 atomic % europium activated rubidium strontium chloride ($RbSr_2Cl_5$:Eu 2.5%). There is a broad excitation range from about 280 nanometers (nm) to about 415 nm and an emission peak at 426 nm.
Figure 2G:
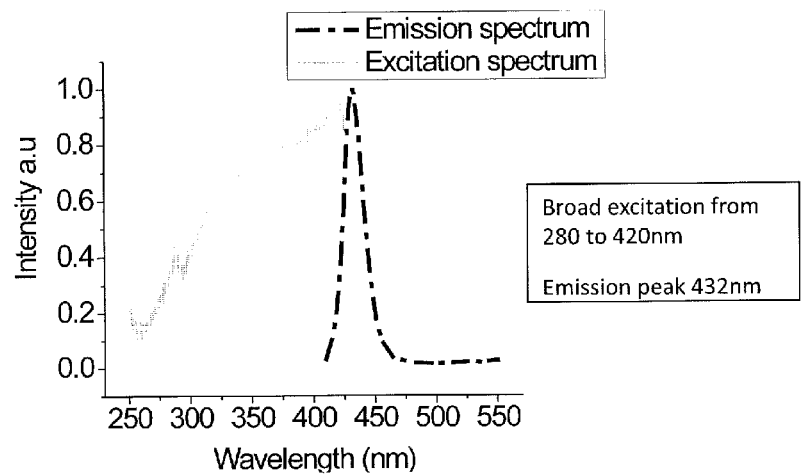
FIG. 2G is a graph showing the photoluminescence emission (broken line) and excitation (solid line) spectra of 2.5 atomic % europium activated potassium strontium bromide ($KSr_2Br_5$:Eu 2.5%). There is a broad excitation range from about 280 nanometers (nm) to about 420 nm and an emission peak at 432 nm.
Figure 2H:
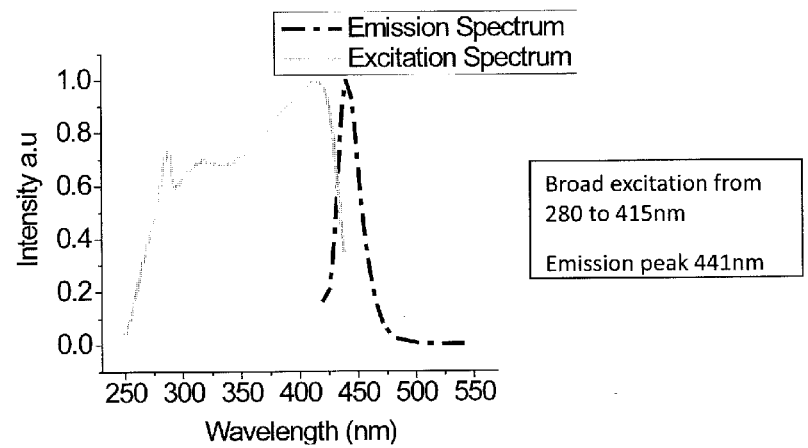
FIG. 2H is a graph showing the photoluminescence emission (broken line) and excitation (solid line) spectra of 2.5 atomic % europium activated potassium barium iodide ($KBa_2I_5$:Eu 2.5%). There is a broad excitation range from about 280 nanometers (nm) to about 415 nm and an emission peak at 441 nm.
Figure 2I:
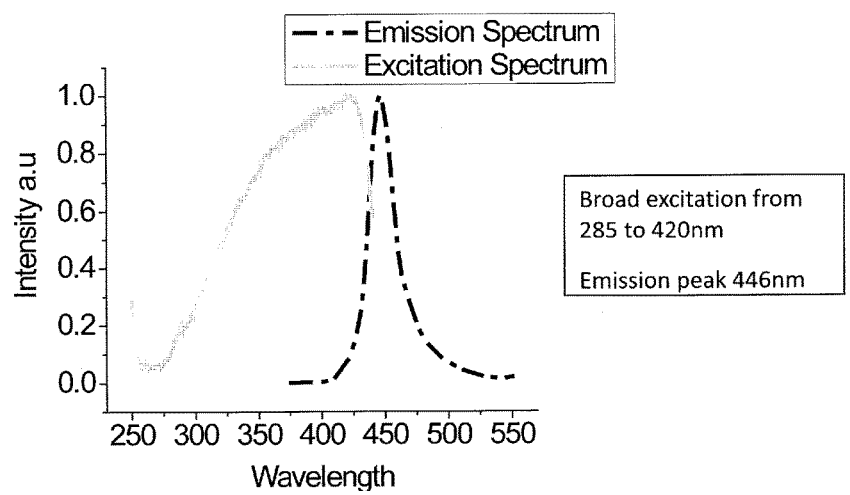
FIG. 2I is a graph showing the photoluminescence emission (broken line) and excitation (solid line) spectra of 2.5 atomic % europium activated cesium strontium iodide ($CsSr_2I_5$:Eu 2.5%). There is a broad excitation range from about 285 nanometers (nm) to about 420 nm and an emission peak at 446 nm.
Figure 2J:
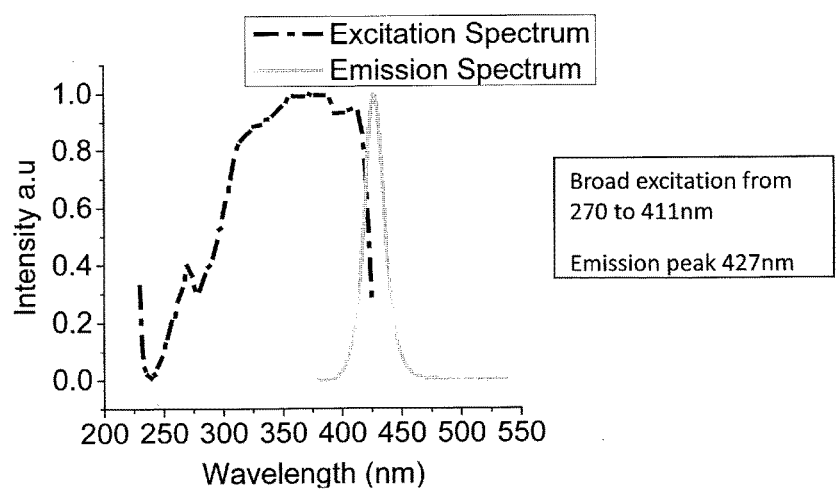
FIG. 2J is a graph showing the photoluminescence emission (solid line) and excitation (broken line) spectra of 2.5 atomic % europium activated rubidium strontium bromide ($RbSr_2Br_5$:Eu 2.5%). There is a broad excitation range from about 270 nanometers (nm) to about 411 nm and an emission peak at 427 nm.
Figure 2K:
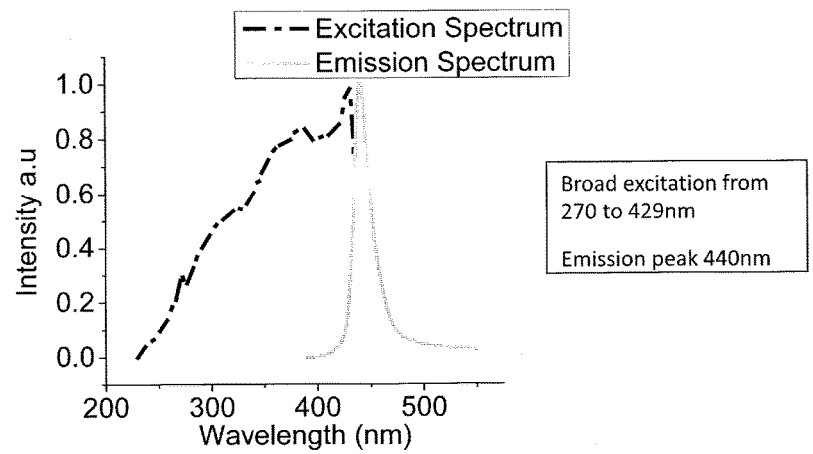
FIG. 2K is a graph showing the photoluminescence emission (solid line) and excitation (broken line) spectra of rubidium europium chloride ($RbEu_2Cl_5$). There is a broad excitation range from about 270 nanometers (nm) to about 429 nm and an emission peak at 440 nm.
Figure 2L:
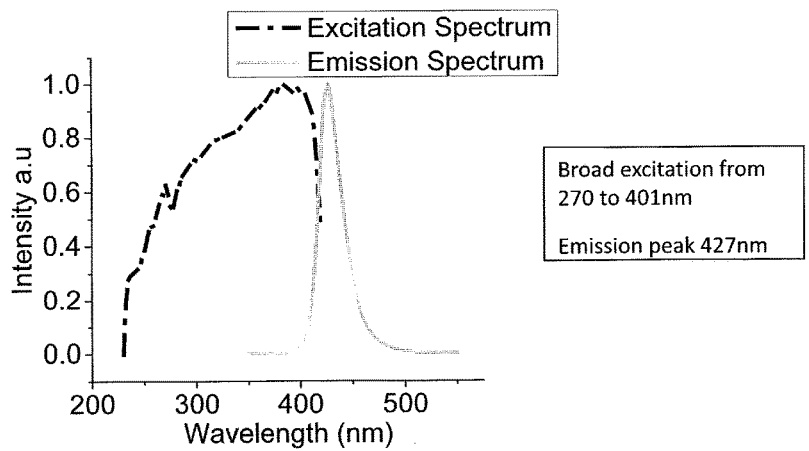
FIG. 2L is a graph showing the photoluminescence emission (solid line) and excitation (broken line) spectra of 2.5 atomic % europium activated rubidium barium bromide ($RbBa_2Br_5$:Eu 2.5%). There is a broad excitation range from about 270 nanometers (nm) to about 401 nm and an emission peak at 427 nm.
Figure 2M:
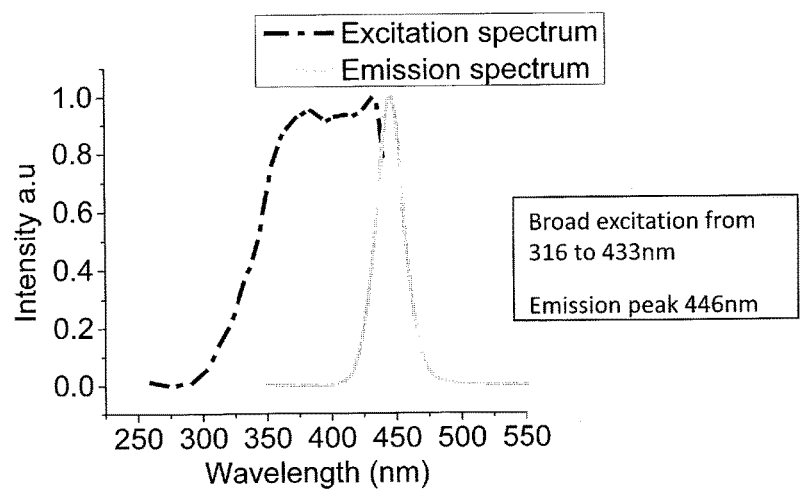
FIG. 2M is a graph showing the photoluminescence emission (solid line) and excitation (broken line) spectra of 4 atomic % europium activated potassium strontium iodide ($KSr_2I_5$:Eu 4%). There is a broad excitation range from about 316 nanometers (nm) to about 433 nm and an emission peak at 446 nm.
Figure 3A:
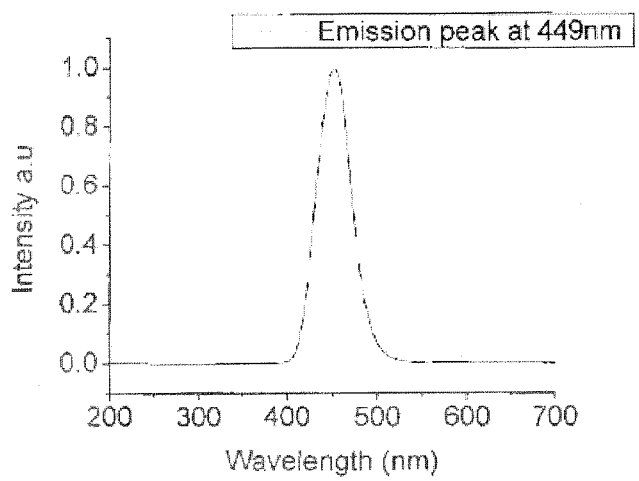
FIG. 3A is a graph showing the x-ray excited luminescence spectra of 5 atomic % europium activated potassium barium iodide ($K_2BaI_4$:Eu 5%). The emission peak is at 449 nanometers (nm).
Figure 3B:
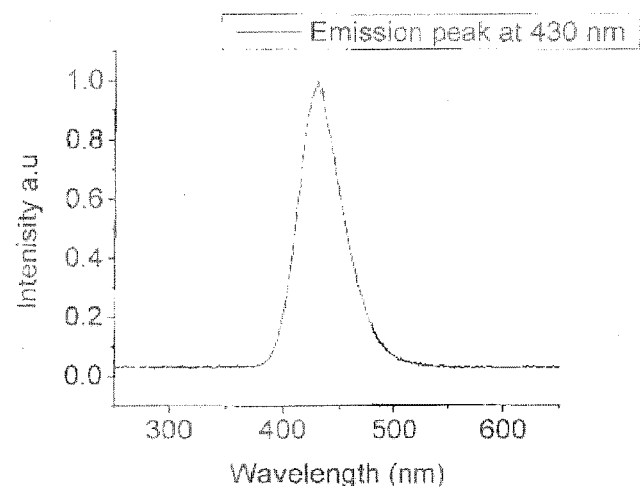
FIG. 3B is a graph showing the x-ray excited luminescence spectra of 5 atomic % europium activated potassium barium bromide ($K_2BaBr_4$:Eu 5%). The emission peak is at 430 nanometers (nm).
Figure 3C:
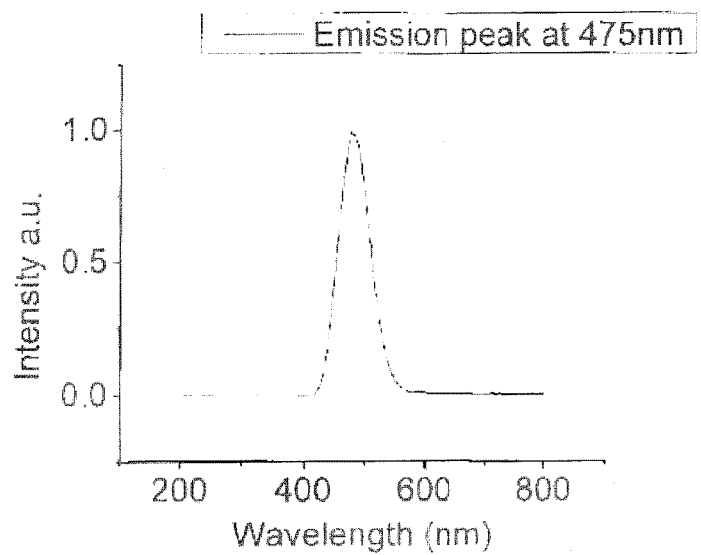
FIG. 3C is a graph showing the x-ray excited luminescence spectra of potassium europium chloride ($K_2EuCl_4$). The emission peak is at 475 nanometers (nm).
Figure 3D:
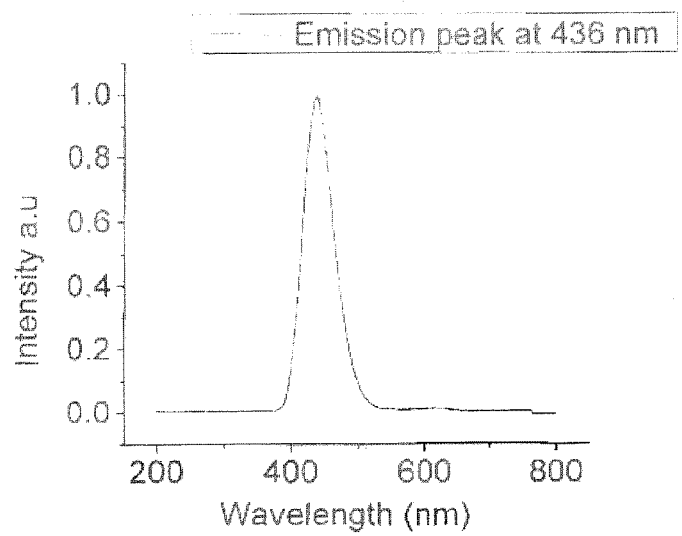
FIG. 3D is a graph showing the x-ray excited luminescence spectra of 5 atomic % europium activated rubidium barium chloride ($Rb_2BaCl_4$:Eu 5%). The emission peak is at 436 nanometers (nm).
Figure 3E:
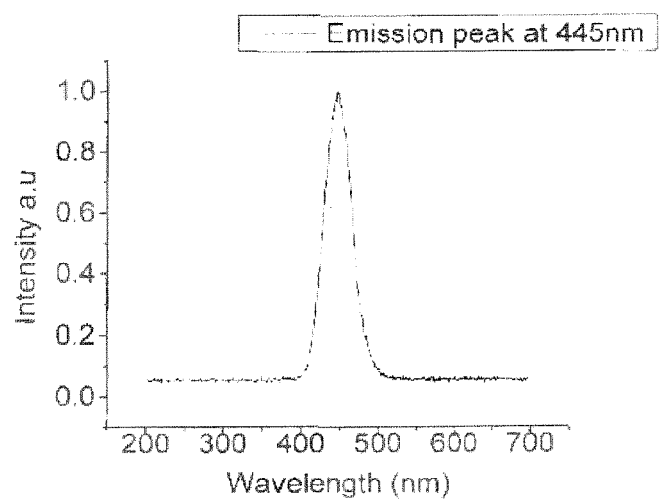
FIG. 3E is a graph showing the x-ray excited luminescence spectra of 5 atomic % europium activated potassium strontium bromide ($K_2SrBr_4$:Eu 5%). The emission peak is at 445 nanometers (nm).
Figure 3F:
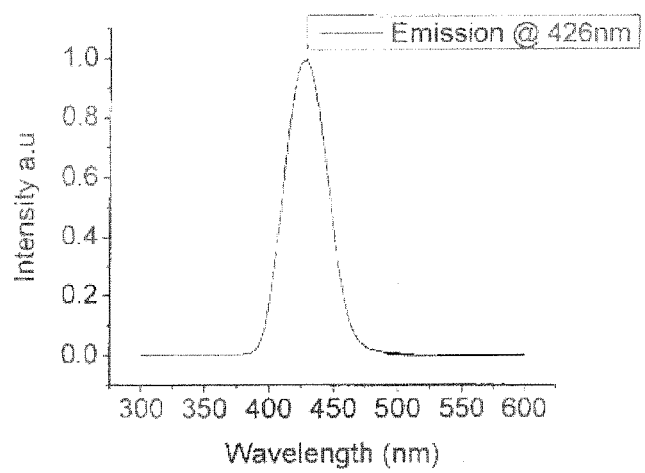
FIG. 3F is a graph showing the x-ray excited luminescence spectra of 2.5 atomic % europium activated rubidium strontium chloride ($RbSr_2Cl_5$:Eu 2.5%). The emission peak is at 426 nanometers (nm).
Figure 3G:
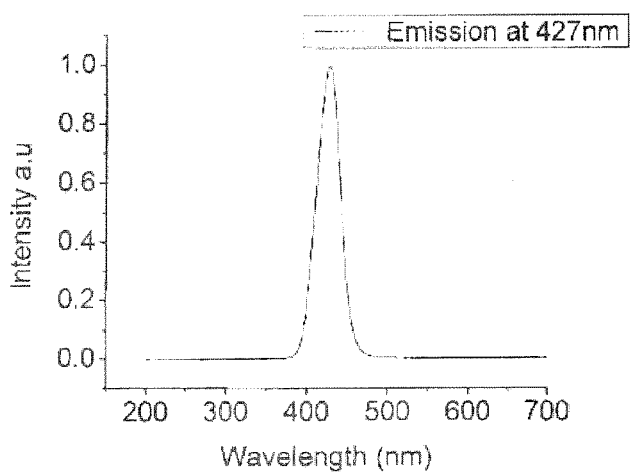
FIG. 3G is a graph showing the x-ray excited luminescence spectra of 2.5 atomic % europium activated potassium strontium bromide ($KSr_2Br_5$:Eu 2.5%). The emission peak is at 427 nanometers (nm).
Figure 3H:
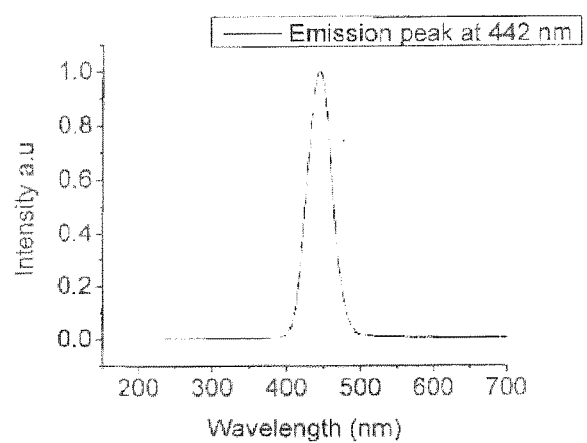
FIG. 3H is a graph showing the x-ray excited luminescence spectra of 2.5 atomic % europium activated potassium barium iodide ($KBa_2I_5$:Eu 2.5%). The emission peak is at 442 nanometers (nm).
Figure 3I:
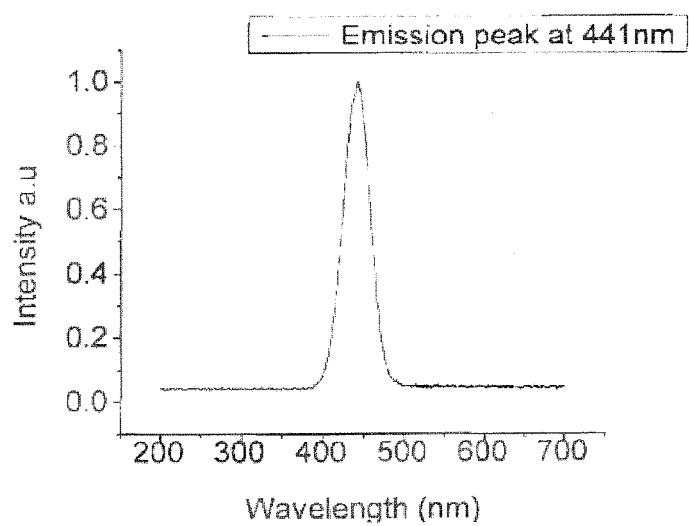
FIG. 3I is a graph showing the x-ray excited luminescence spectra of 2.5 atomic % europium activated cesium strontium iodide ($CsSr_2I_5$:Eu 2.5%). The emission peak is at 441 nanometers (nm).
Figure 3J:
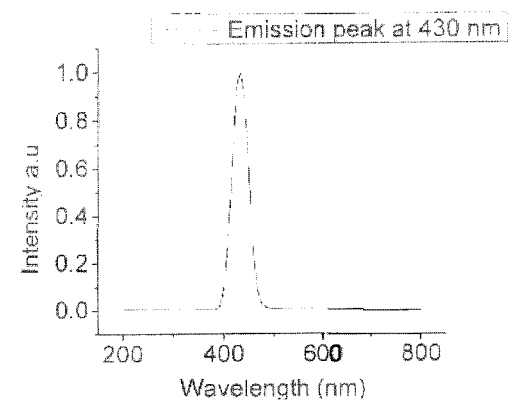
FIG. 3J is a graph showing the x-ray excited luminescence spectra of 2.5 atomic % europium activated rubidium strontium bromide ($RbSr_2Br_5$:Eu 2.5%). The emission peak is at 430 nanometers (nm).
Figure 3K:
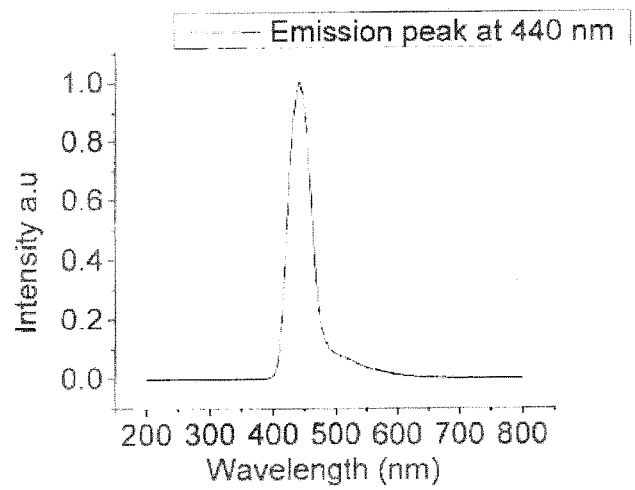
FIG. 3K is a graph showing the x-ray excited luminescence spectra of rubidium europium chloride ($RbEu_2Cl_5$). The emission peak is at 440 nanometers (nm).
Figure 3L:
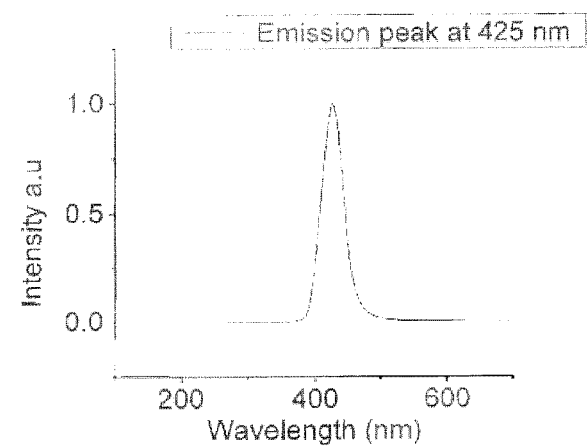
FIG. 3L is a graph showing the x-ray excited luminescence spectra of 2.5 atomic % europium activated rubidium barium bromide ($RbBa_2Br_5$:Eu 2.5%). The emission peak is at 425 nanometers (nm).
Figure 3M:
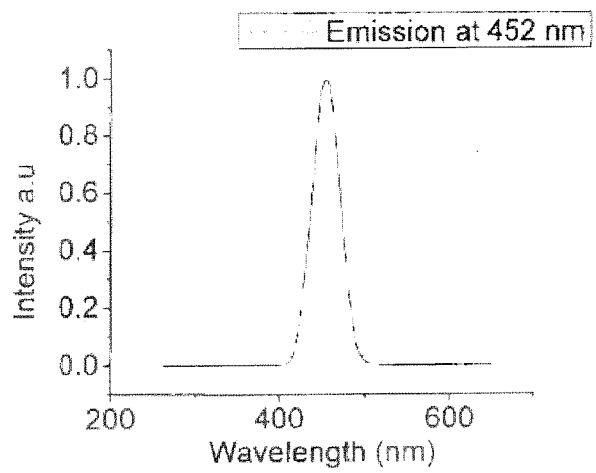
FIG. 3M is a graph showing the x-ray excited luminescence spectra of 2.5 atomic % europium activated potassium strontium iodide ($KSr_2I_5$:Eu 2.5%). The emission peak is at 452 nanometers (nm).
Figure 4A:
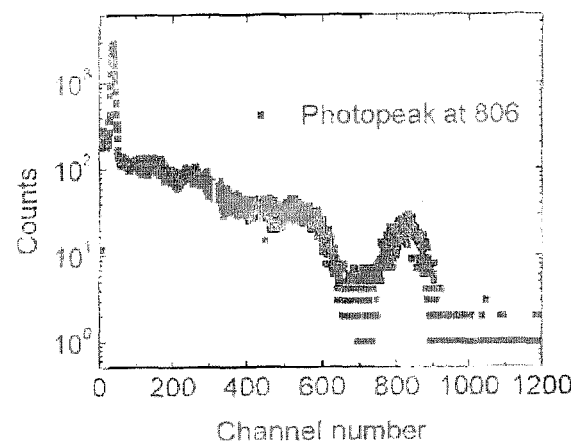
FIG. 4A is a graph showing the light output of 5 atomic % europium activated potassium barium iodide ($K_2BaI_4$:Eu 5%) exposed to gamma-ray energy. The photopeak is at channel number 806.
Figure 4B:
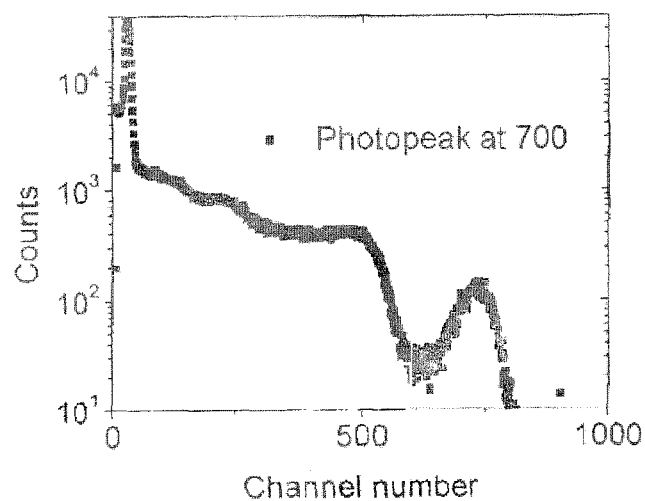
FIG. 4B is a graph showing the light output of 5 atomic % europium activated potassium barium bromide ($K_2BaBr_4$:Eu 5%) exposed to gamma-ray energy. The photopeak is at channel 700.
Figure 4C:
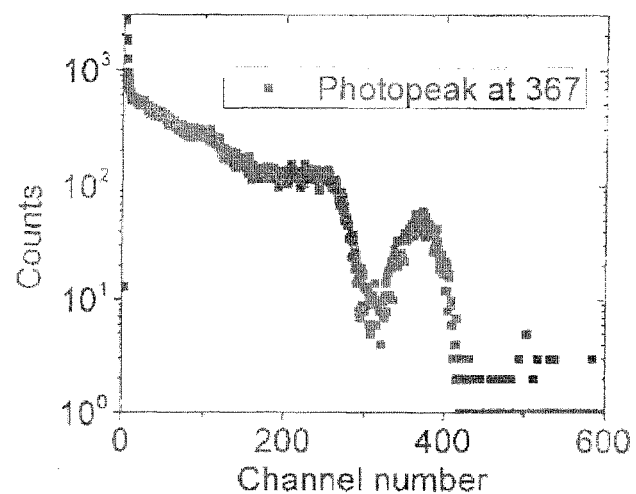
FIG. 4C is a graph showing the light output of potassium europium chloride ($K_2EuCl_4$) exposed to gamma-ray energy. The photopeak is at channel 367.
Figure 4D:
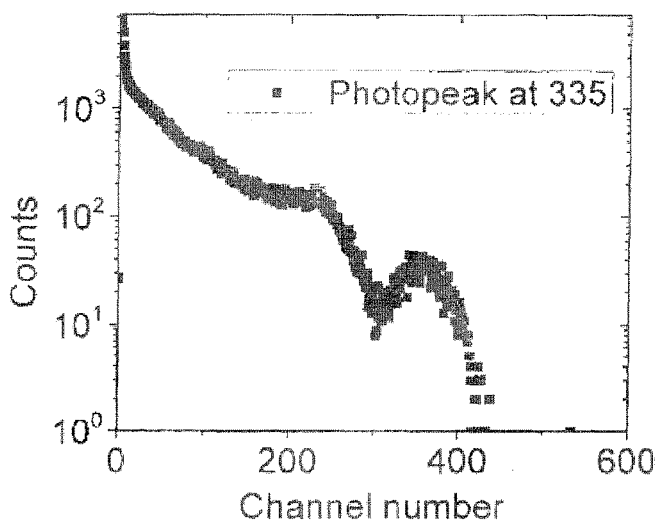
FIG. 4D is a graph showing the light output of 5 atomic % europium activated rubidium barium chloride ($Rb_2BaCl_4$:Eu 5%) exposed to gamma-ray energy. The photopeak is at channel 335.
Figure 4E:
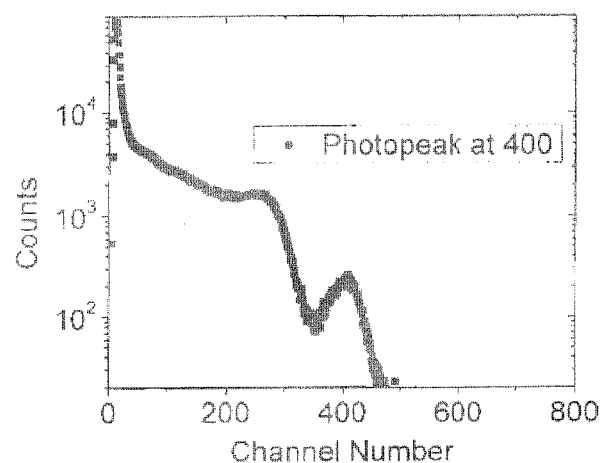
FIG. 4E is a graph showing the light output of 5 atomic % europium activated potassium strontium bromide ($K_2SrBr_4$:Eu 5%) exposed to gamma-ray energy. The photopeak is at channel 400.
Figure 4F:
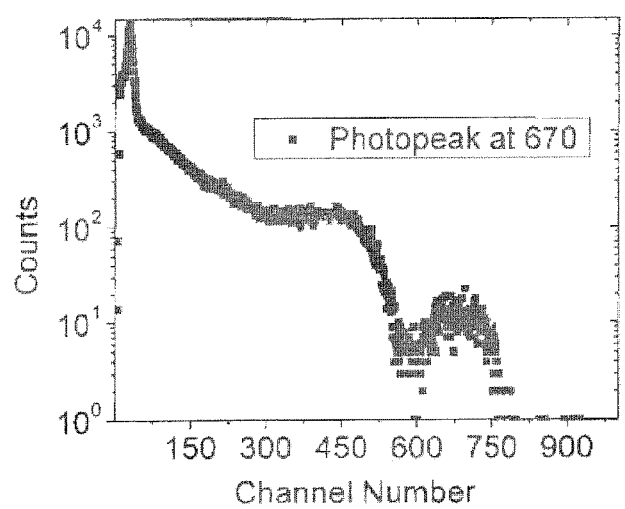
FIG. 4F is a graph showing the light output of 2.5 atomic % europium activated rubidium strontium chloride ($RbSr_2Cl_5$:Eu 2.5%) exposed to gamma-ray energy. The photopeak is at channel 670.
Figure 4G:
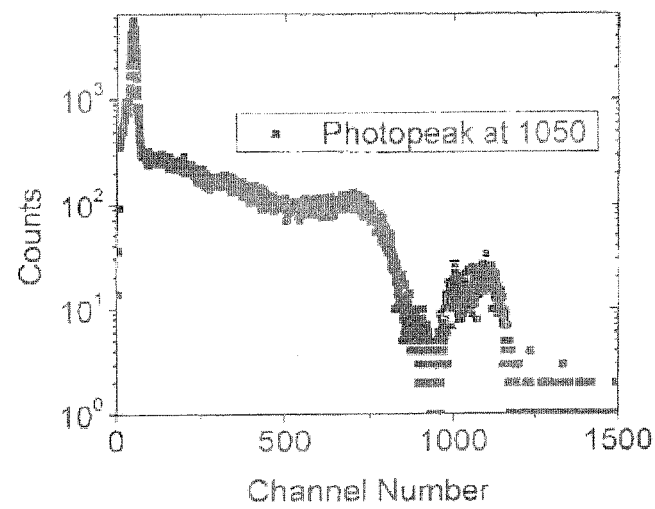
FIG. 4G is a graph showing the light output of 2.5 atomic % europium activated potassium strontium bromide ($KSr_2Br_5$:Eu 2.5%) exposed to gamma-ray energy. The photopeak is at channel 1050.
Figure 4H:
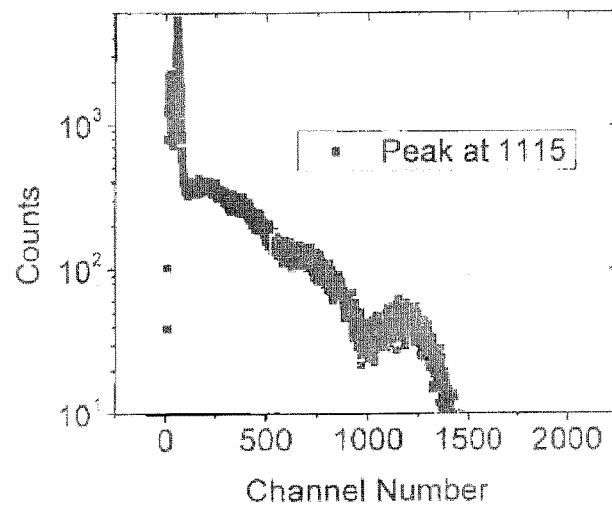
FIG. 4H is a graph showing the light output of 2.5 atomic % europium activated potassium barium iodide ($KBa_2I_5$:Eu 2.5%) exposed to gamma-ray energy. The photopeak is at channel 1115.
Figure 4I:
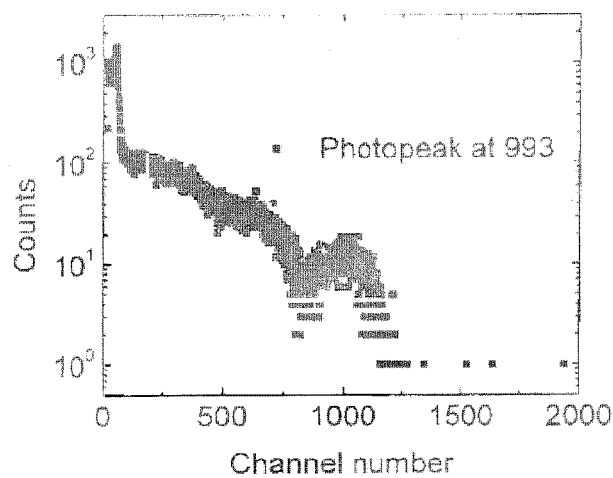
FIG. 4I is a graph showing the light output of 2.5 atomic % europium activated cesium strontium iodide ($CsSr_2I_5$:Eu 2.5%) exposed to gamma-ray energy. The photopeak is at channel 993.
Figure 4J:
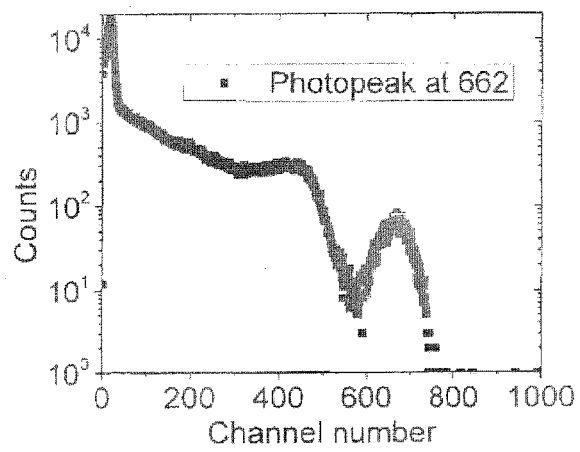
FIG. 4J is a graph showing the light output of 2.5 atomic % europium activated rubidium strontium bromide ($RbSr_2Br_5$:Eu 2.5%) exposed to gamma-ray energy. The photopeak is at channel 662.
Figure 4K:
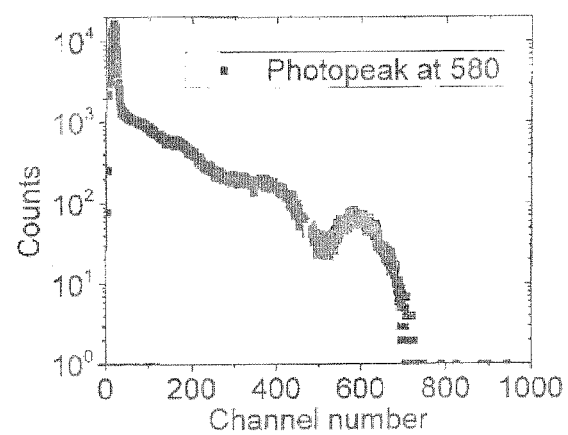
FIG. 4K is a graph showing the light output of rubidium europium chloride ($RbEu_2Cl_5$) exposed to gamma-ray energy. The photopeak is at channel 580.
Figure 4L:
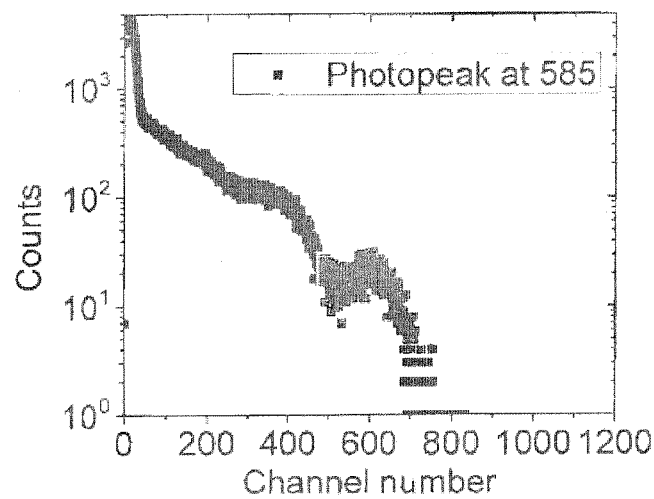
FIG. 4L is a graph showing the light output of 2.5 atomic % europium activated rubidium barium bromide ($RbBa_2Br_5$:Eu 2.5%) exposed to gamma-ray energy. The photopeak is at channel 585.
Figure 4M:
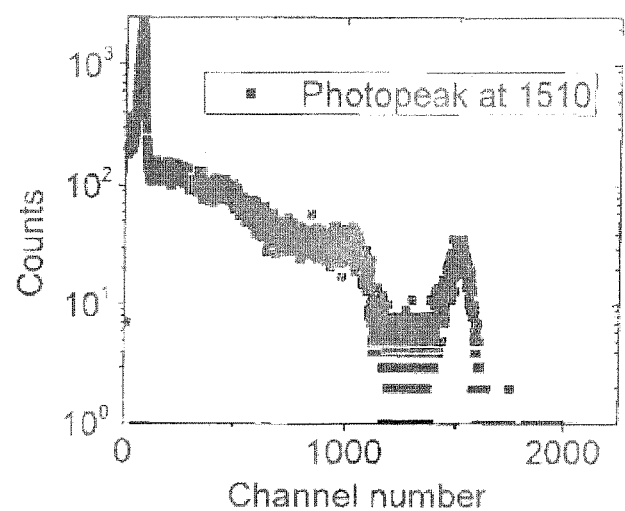
FIG. 4M is a graph showing the light output of 4 atomic % europium activated potassium strontium iodide ($KSr_2I_5$:Eu 4%) exposed to gamma-ray energy. The photopeak is at channel 1510.
Figure 5A:
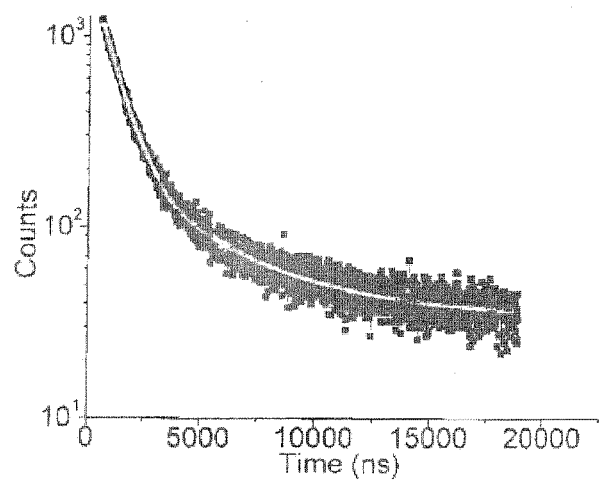
FIG. 5A is a graph showing the scintillation decay curve for 5 atomic % europium activated potassium barium iodide ($K_2BaI_4$:Eu 5%).
Figure 5B:
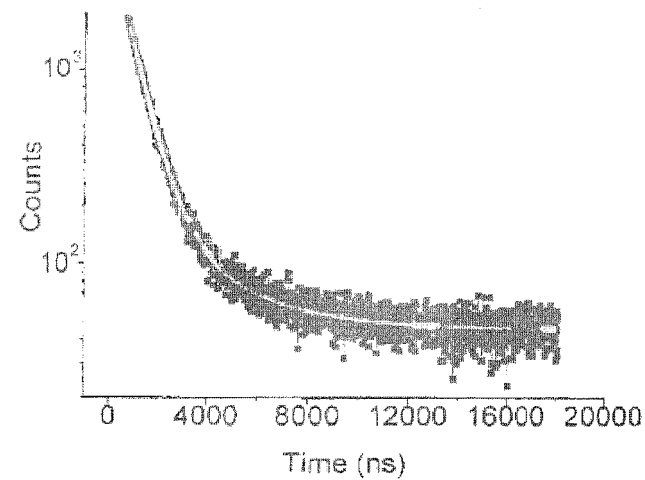
FIG. 5B is a graph showing the scintillation decay curve for 5 atomic % europium activated potassium barium bromide ($K_2BaBr_4$:Eu 5%).
Figure 5C:
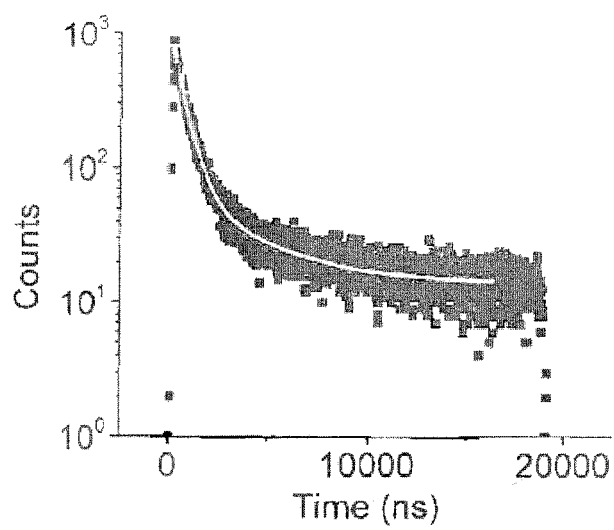
FIG. 5C is a graph showing the scintillation decay curve for potassium europium chloride ($K_2EuCl_4$).
Figure 5D:
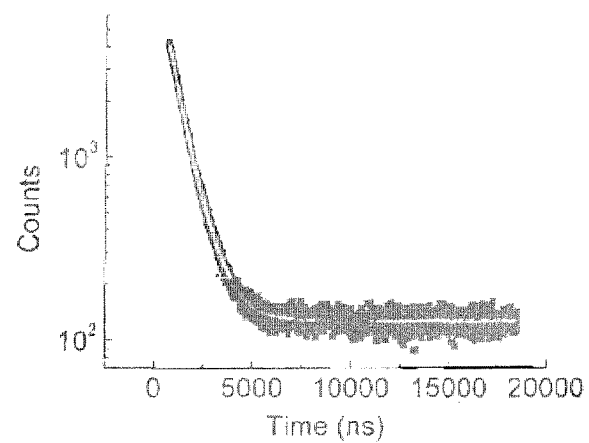
FIG. 5D is a graph showing the scintillation decay curve for 5 atomic % europium activated potassium strontium bromide ($K_2SrBr_4$:Eu 5%).
Figure 5E:
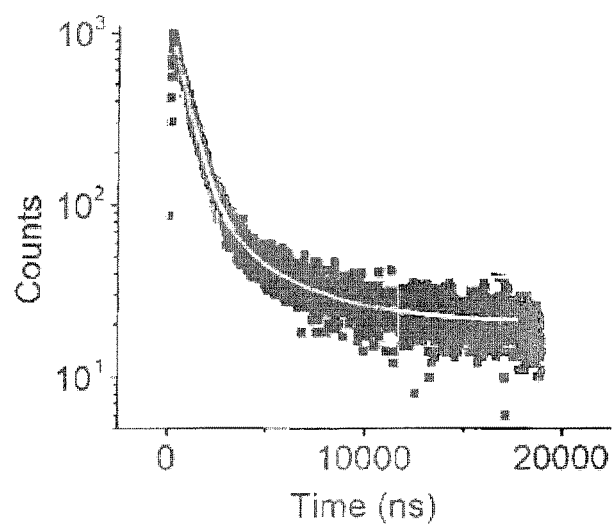
FIG. 5E is a graph showing the scintillation decay curve for 5 atomic % europium activated rubidium barium chloride ($Rb_2BaCl_4$:Eu 5%).
Figure 5F:
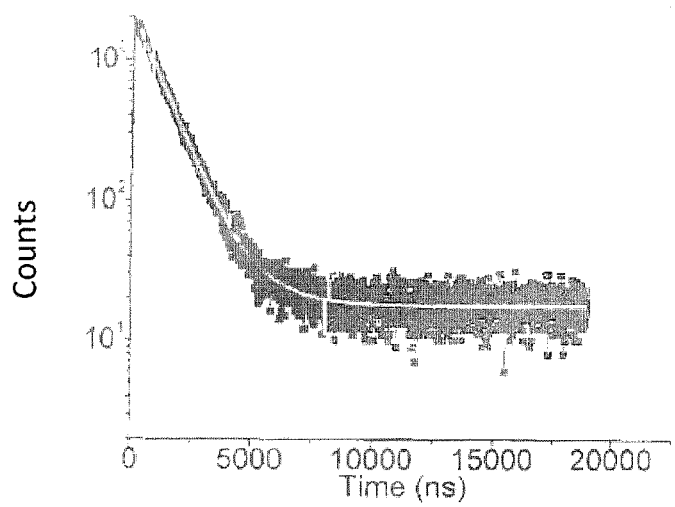
FIG. 5F is a graph showing the scintillation decay curve for 2.5 atomic % europium activated rubidium strontium chloride ($RbSr_2Cl_5$:Eu 2.5%).
Figure 5G:
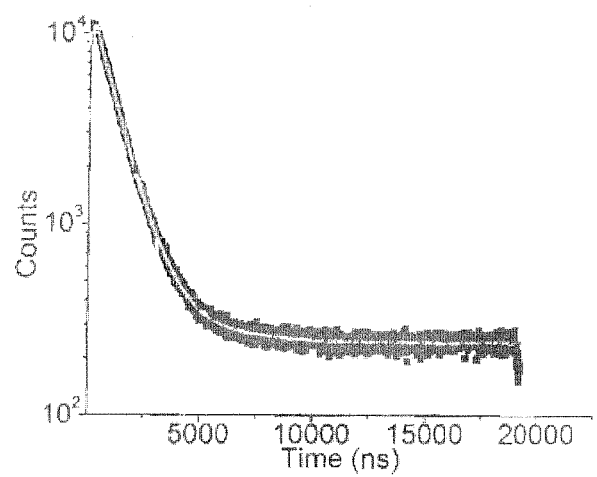
FIG. 5G is a graph showing the scintillation decay curve for 2.5 atomic % europium activated potassium strontium bromide ($KSr_2Br_5$:Eu 2.5%).
Figure 5H:
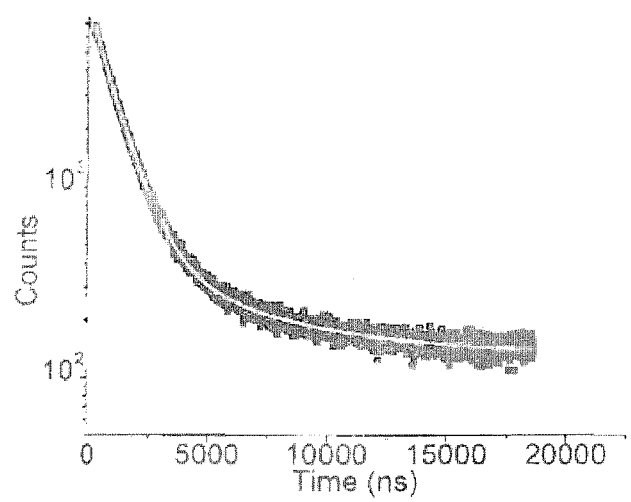
FIG. 5H is a graph showing the scintillation decay curve for 2.5 atomic % europium activated potassium barium iodide ($KBa_2I_5$:Eu 2.5%).
Figure 5I:
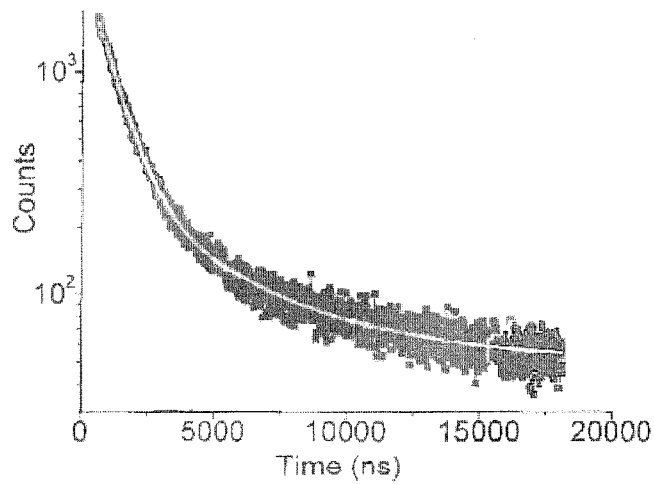
FIG. 5I is a graph showing the scintillation decay curve for 2.5 atomic % europium activated cesium strontium iodide ($CsSr_2I_5$:Eu 2.5%).
Figure 5J:
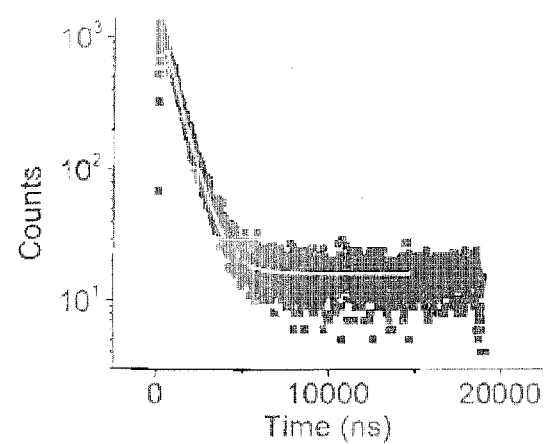
FIG. 5J is a graph showing the scintillation decay curve for 2.5 atomic % europium activated rubidium strontium bromide ($RbSr_2Br_5$:Eu 2.5%).
Figure 5K:
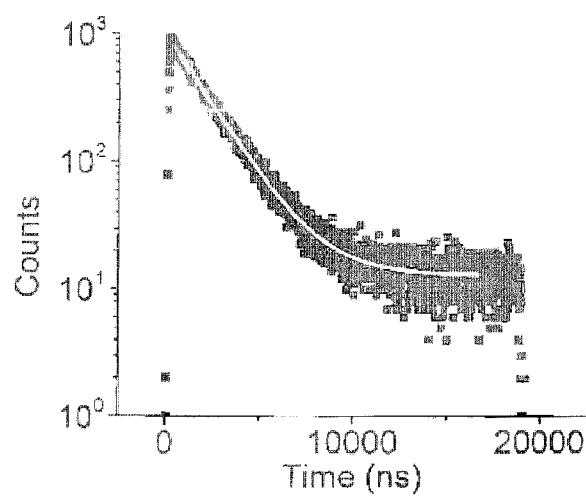
FIG. 5K is a graph showing the scintillation decay curve for rubidium europium chloride ($RbEu_2Cl_5$).
Figure 5L:
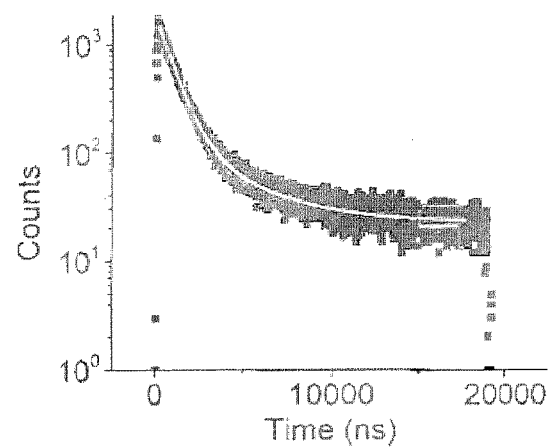
FIG. 5L is a graph showing the scintillation decay curve for 2.5 atomic % europium activated rubidium barium bromide ($RbBa_2Br_5$:Eu 2.5%).
Figure 5M:
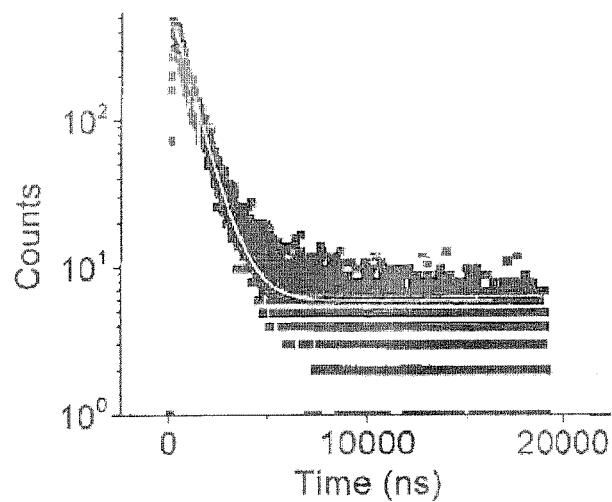
FIG. 5M is a graph showing the scintillation decay curve for 4 atomic % europium activated potassium strontium iodide ($KSr_2I_5$:Eu 4%).

The presently disclosed subject matter will now be described more fully. The presently disclosed subject matter can, however, be embodied in different forms and should not be construed as limited to the embodiments set forth herein below and in the accompanying Examples. Rather, these embodiments are provided so that this disclosure will be thorough and complete, and will fully convey the scope of the embodiments to those skilled in the art.

All references listed herein, including but not limited to all patents, patent applications and publications thereof, and scientific journal articles, are incorporated herein by reference in their entireties to the extent that they supplement, explain, provide a background for, or teach methodology, techniques, and/or compositions employed herein.

I. Definitions

While the following terms are believed to be well understood by one of ordinary skill in the art, the following definitions are set forth to facilitate explanation of the presently disclosed subject matter.

Unless defined otherwise, all technical and scientific terms used herein have the same meaning as commonly understood to one of ordinary skill in the art to which the presently disclosed subject matter belongs.

Following long-standing patent law convention, the terms "a", "an", and "the" refer to "one or more" when used in this application, including the claims.

The term "and/or" when used in describing two or more items or conditions, refers to situations where all named items or conditions are present or applicable, or to situations wherein only one (or less than all) of the items or conditions is present or applicable.

The use of the term "or" in the claims is used to mean "and/or" unless explicitly indicated to refer to alternatives only or the alternatives are mutually exclusive, although the disclosure supports a definition that refers to only alternatives and "and/or." As used herein "another" can mean at least a second or more.

The term "comprising", which is synonymous with "including," "containing," or "characterized by" is inclusive or open-ended and does not exclude additional, unrecited elements or method steps. "Comprising" is a term of art used in claim language which means that the named elements are essential, but other elements can be added and still form a construct within the scope of the claim.

As used herein, the phrase "consisting of" excludes any element, step, or ingredient not specified in the claim. When the phrase "consists of" appears in a clause of the body of a claim, rather than immediately following the preamble, it limits only the element set forth in that clause; other elements are not excluded from the claim as a whole.

As used herein, the phrase "consisting essentially of" limits the scope of a claim to the specified materials or steps, plus those that do not materially affect the basic and novel characteristic(s) of the claimed subject matter.

With respect to the terms "comprising", "consisting of", and "consisting essentially of", where one of these three terms is used herein, the presently disclosed and claimed subject matter can include the use of either of the other two terms.

Unless otherwise indicated, all numbers expressing quantities of time, temperature, light output, atomic percentage (%), and so forth used in the specification and claims are to be understood as being modified in all instances by the term "about". Accordingly, unless indicated to the contrary, the numerical parameters set forth in this specification and attached claims are approximations that can vary depending upon the desired properties sought to be obtained by the presently disclosed subject matter.

As used herein, the term "about", when referring to a value is meant to encompass variations of in one example ±20% or ±10%, in another example ±5%, in another example ±1%, and in still another example ±0.1% from the specified amount, as such variations are appropriate to perform the disclosed methods.

The term "scintillator" refers to a material that emits light (e.g., visible light) in response to stimulation by high energy radiation (e.g., X, α, β, or γ radiation).

In some embodiments, the compositional formula expression of a scintillator material can contain a colon ":", wherein the composition of the main scintillation material is indicated on the left side of the colon, and the activator or dopant ion is indicated on the right side of the colon. The atomic percentage of the dopant or activator ion can also be indicated to the right side of the colon. For the presently disclosed ternary metal scintillators that comprise an alkali metal and an alkali earth metal, the atomic percentage of a divalent dopant ion (e.g., divalent europium ion) can be expressed in atomic percentage relative to the total amount of dopant and alkali earth metal. Thus, the dopant ion can be a divalent ion that substitutes for a percentage of the divalent alkali earth metal ion in the base (i.e., main or un-doped) ternary metal halide composition. For example, $K_2BaBr_4$:Eu 5% represents a $K_2BaBr_4$ scintillator material activated by europium, wherein 5 atomic % of the barium is replaced by europium. In some embodiments, the dopant is a monovalent ion that substitutes for a percentage of the alkali metal ion in the base ternary metal halide composition. Thus, the atomic % of a monovalent dopant can be expressed as the atomic % relative to the total amount of dopant and alkali metal.

The term "high energy radiation" can refer to electromagnetic radiation having energy higher than that of ultraviolet radiation, including, but not limited to X radiation (i.e., X-ray radiation), alpha (α) particles, gamma (γ) radiation, and beta (β) radiation. In some embodiments, the high energy radiation refers to gamma rays, cosmic rays, X-rays, and/or particles having an energy of 1 keV or greater. Scintillator materials as described herein can be used as components of radiation detectors in apparatuses such as counters, image intensifiers, and computed tomography (CT) scanners.

"Optical coupling" as used herein refers to a physical coupling between a scintillator and a photosensor, e.g., via the presence of optical grease or another optical coupling compound (or index matching compound) that bridges the gap between the scintillator and the photosensor. In addition to optical grease, optical coupling compounds can include, for example, liquids, oils and gels.

"Light output" can refer to the number of light photons produced per unit energy deposited, e.g., by a gamma ray being detected, typically the number of light photons/MeV.

As used herein, chemical ions are typically represented simply by their chemical element symbols alone (e.g., Eu for europium ion(s) (e.g., $Eu^{2+}$) or Na for sodium ion(s) (e.g., $Na^+$)). Similarly, the terms "alkali metal" and "alkali earth metal" are used herein to refer to an alkali metal ion or ions and an alkali earth metal ion or ions, respectively.

II. General Considerations

In some embodiments, the presently disclosed subject matter provides a scintillator material that comprises a ternary metal halide doped or activated with europium (Eu) and/or one or more other dopants (e.g., cerium (Ce), praseodymium (Pr), terbium (Tb), ytterbium (Yb), thallium (Tl), indium (In), sodium (Na), and other dopants that can luminesce in response to the absorption of energy). For instance, the base ternary metal halide being activated or doped can have a formula $A_2BX_4$ or $AB_2X_5$, wherein A is an alkali metal or metals, B is an alkali earth metal or metals; and X is one or more halide. In some embodiments, the base ternary metal halide being activated or doped can have the formula $A'_2BX_4$ or $A'B_2X_5$, wherein A' is an alkali metal or metals other than Na; B is one or more alkali earth metal; and X is one or more halide. In some embodiments, the base ternary metal halide being activated or doped can have the formula $A''_2BX_4$ or $A''B_2X_5$, wherein A'' is Na or a combination of Na and one or more additional alkali metal; B is one or more alkali earth metal; and X is one or more halide. The europium dopant, other dopant, or dopant mixture can replace all or a portion of the alkali earth metal (e.g., if the dopant ion is divalent or includes divalent ions) and/or all or a portion of the alkali metal (if the dopant ion is or includes monovalent ions).

In some embodiments, the dopant or dopants replaces up to about 50 atomic % of the alkali earth metal(s) or alkali metal(s) (e.g., up to about 50, 45, 40, 35, 30, 25, 20, 15, 10, 5, 4, 3, 2, or about 1 atomic % of the alkali earth metal(s) or alkali metal(s)). In some embodiments, the dopant or dopants replaces up to about 20 atomic % of the alkali earth metal(s) or alkali metal(s) or between about 2.5 atomic % and about 10 atomic % of the alkali earth metal(s) or alkali metal(s).

In some embodiments, the presently disclosed subject matter provides a ternary metal halide scintillator material of one of the Formulas (I), (II), (IIIa), or (IVa):

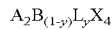  (I);

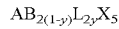  (II);

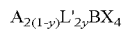  (IIIa); or

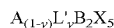  (IVa);

wherein: A is one or more alkali metal, such as lithium (Li), sodium (Na), potassium (K), rubidium (Rb), cesium (Cs), or a combination thereof; B is one or more alkali earth metal, such as beryllium (Be), magnesium (Mg), calcium (Ca), strontium (Sr), barium (Ba), or a combination thereof; L is a divalent dopant or mixture of divalent dopants (e.g., selected from Eu, Ce, Tb, Yb, and Pr); L' is a monovalent dopant or mixture of monovalent dopants (e.g., selected from Tl, In, and Na); and X is one or more halide, such as fluoride (F), chloride (Cl), bromide (Br), iodide (I), or a combination thereof; and $0.0001 \leq y \leq 0.5$, subject to the proviso that, in materials of Formula (IIIa) or Formula (IVa), when A is Na or a combination of Na and one or more additional alkali metal, L' is a monovalent dopant or mixture of monovalent dopants other than Na (e.g., L' is selected from Tl and In). Thus, in some embodiments, the scintillator materials can comprise europium- and/or other dopant-containing metal tetra- and pentahalides, wherein the metal tetra- and pentahalides can comprise alkali metal and alkali earth metal ions. In some embodiments, the scintillator material can comprise a mixture of two or more materials of Formulas (I), (II), (IIIa), and/or (IVa).

In some embodiments, the presently disclosed subject matter provides a ternary metal halide scintillator material of one of the Formulas (I), (II), (III), (IV), (V) or (VI):

  (I);

  (II);

  (III);

  (IV);

  (V); or

  (VI);

wherein: A is one or more alkali metal, such as Li, Na, K, Rb, Cs, or a combination thereof; A' is one or more alkali metal other than Na; A'' is Na or a combination of Na and one or more additional alkali metal (e.g., Li, K, Rb, or Cs); B is one or more alkali earth metal, such as Be, Mg, Ca, Sr, Ba, or a combination thereof; L is a divalent dopant or mixture of divalent dopants (e.g., selected from Eu, Ce, Tb, Yb and Pr); L' is a monovalent dopant or mixture of monovalent dopants (e.g., selected from Tl, In, and Na); L'' is a monovalent dopant other than Na (e.g., is selected from Tl and In); and X is one or more halide, such as F, Cl, Br, I, or a combination thereof; and wherein $0.0001 \leq y \leq 0.5$. In some embodiments, the scintillator material can comprise a mixture of two or more materials of Formulas (I), (II), (III), (IV), (V), and/or (VI).

Alkali metal A can be any suitable alkali metal or combination of alkali metals. In some embodiments, A is selected from the group comprising Li, Na, K, Rb, Cs, and combinations thereof. In some embodiments, A' is selected from the group comprising Li, K, Rb, and Cs. In some embodiments, A or A' is selected from the group comprising K, Rb, and Cs. In some embodiments, A'' is Na or a combination of Na and one or more of Li, K, Rb and Cs.

Alkali earth metal B can be any suitable alkali earth metal or combination of alkali earth metals. In some embodiments, B is selected from the group comprising Be, Mg, Ca, Sr, Ba, and combinations thereof. In some embodiments, B is selected from Sr and Ba.

Halide X can be any suitable halide or combination of halides, e.g., I, F, Br, and Cl. In some embodiments, X is selected from Cl, Br, and I.

In some embodiments, L is Eu, Ce Tb, Yb, or Pr. In some embodiments, L is Eu, Ce, or Pr. In some embodiments, L is Eu (which can be present as $Eu^{2+}$). In some embodiments, L (e.g. Eu) replaces about 20 atomic % or less of the alkali earth metal or metals. In some embodiments L (e.g., Eu) replaces between about 1 atomic % and about 10 atomic % of the alkali earth metal or metals. In some embodiments, $0.01 \leq y \leq 0.1$ (e.g., y is about 0.01, 0.02, 0.03, 0.04, 0.05, 0.06, 0.07, 0.08, 0.09 or about 0.10). In some embodiments, $0.025 \leq y \leq 00.05$. In some embodiments, L (e.g., Eu) replaces about 2.5, 4, or about 5 atomic % of the alkali earth metal. In some embodiments, the scintillator material has one of the formulas: $A_2B_{0.95}Eu_{0.05}X_4$ or $AB_{2(0.975)}Eu_{2(0.025)}X_5$.

In some embodiments, L' is Tl, In, or Na, and L' replaces about 20 atomic % or less of the alkali metal or metals A'. In some embodiments, L' replaces between about 1 atomic % and about 10 atomic % of the alkali metal or metals A' (e.g., y is about 0.01, 0.02, 0.03, 0.04, 0.05, 0.06, 0.07, 0.08, 0.09 or about 0.10). In some embodiments, $0.025 \leq y \leq 0.05$.

In some embodiments, L" is Tl or In and L" replaces about 20 atomic % or less of A". In some embodiments, L" replaces between about 1 atomic % and about 10 atomic % of the alkali metal or metals A" (e.g., y is about 0.01, 0.02, 0.03, 0.04, 0.05, 0.06, 0.07, 0.08, 0.09 or about 0.10). In some embodiments, $0.025 \leq y \leq 0.05$.

Exemplary scintillation materials of the presently disclosed subject matter can include, but are not limited to, $K_2BaI_4$:Eu 5%; $K_2BaBr_4$:Eu 5%; $Rb_2BaCl_4$:Eu 5%; $K_2SrBr_4$:Eu 5%; $Rb_2BaCl_4$:Eu 2.5%; $RbSr_2Cl_5$:Eu 2.5%; $KSr_2Br_5$:Eu 2.5%; $KBa_2I_5$:Eu 2.5%; $CsSr_2I_5$:Eu 2.5%; $RbBa_2Br_5$:Eu 2.5%; $RbSr_2Br_5$:Eu 2.5%; $KSr_2I_5$:Eu 4%; and $KSr_2I_5$:Eu 2.5%.

In some embodiments, the activator or dopant can replace up to about 100 atomic % of the alkali metal or metals or of the alkali earth metal or metals. Thus, in some embodiments, the scintillator material can comprise one of Formulas (I'), (II'), (IIIa') or (IVa'):

$$A_2B_{(1-z)}L_zX_4 \quad (I');$$

$$AB_{2(1-z)}L_{2z}X_5 \quad (II');$$

$$A_{2(1-z)}L'_{2z}BX_4 \quad (IIIa'); \text{ or}$$

$$A_{(1-z)}L'_zB_2X_5 \quad (IVa');$$

wherein: $0.0001 \leq z \leq 1.0$, and A is one or more alkali metal (e.g., Li, Na, K, Rb, or Cs); B is one or more alkali earth metal (e.g., Be, Mg, Ca, Sr, or Ba), L is a divalent dopant or mixture of divalent dopants (e.g., Eu, Ce, Tb, Yb, or Pr); L' is a monovalent dopant or mixture of monovalent dopants (e.g., Tl, In, or Na); and X is one or more halide, subject to the proviso that, in materials of Formula (IIIa') or (IVa'), when A is Na or a combination of Na and one or more additional alkali metal, L' is other than Na (e.g., L' is Tl or In). In some embodiments, the scintillator material can comprise a mixture of two or more materials of Formulas (I'), (II'), (III'), and/or (IVa').

In some embodiments, the scintillator material can comprise one of Formulas (I'), (II'), (III'), (IV'), (V') or (VI'):

$$A_2B_{(1-z)}L_zX_4 \quad (I');$$

$$AB_{2(1-z)}L_{2z}X_5 \quad (II');$$

$$A'_{2(1-z)}L'_{2z}BX_4 \quad (III');$$

$$A'_{(1-z)}L'_zB_2X_5 \quad (IV');$$

$$A''_{2(1-z)}L''_{2z}BX_4 \quad (V'); \text{ or}$$

$$A''_{(1-z)}L''_zB_2X_5 \quad (VI');$$

wherein $0.0001 \leq z \leq 1.0$ and wherein A, A', A", B, L, L', and L" are as defined for Formulas (I), (II), (III), (IV), (V), and (VI). In some embodiments, the scintillator material can comprise a mixture of two or more materials of Formulas (I'), (II'), (III'), (IV'), (V'), and/or (VI').

In some embodiments, $0.01 \leq z \leq 0.1$. In some embodiments, $0.025 \leq z \leq 0.05$. In some embodiments, the scintillation material of Formulas (I') or (II') can comprise $A_2B_{0.95}Eu_{0.05}X_4$ or $AB_{2(0.975)}Eu_{2(0.025)}X_5$. In some embodiments, the scintillator material of Formulas (I') or (II') can be selected from the group comprising, but not limited to: $K_2BaI_4$:Eu 5%; $K_2BaBr_4$:Eu 5%; $Rb_2BaCl_4$:Eu 5%; $K_2SrBr_4$:Eu 5%; $Rb_2BaCl_4$:Eu 2.5%; $RbSr_2Cl_5$:Eu 2.5%; $KSr_2Br_5$:Eu 2.5%; $KBa_2I_5$:Eu 2.5%; $CsSr_2I_5$:Eu 2.5%; $RbBa_2Br_5$:Eu 2.5%; $RbSr_2Br_5$:Eu 2.5%; $KSr_2I_5$:Eu 4%; and $KSr_2I_5$:Eu 2.5%.

In some embodiments, $0.5 < z \leq 1.0$ (i.e., z is greater than 0.5 and less than or equal to 1). Thus, in some embodiments, the activator or dopant replaces between about 50.01 atomic % and about 100 atomic % of the alkali metal(s) or alkali earth metal(s).

In some embodiments, z is 1; the alkali earth metal is not present; and the scintillation material comprises $A_2LX_4$ or $AL_2X_5$. In some embodiments, L is Eu and the scintillation material has one of the formulas: $A_2EuX_4$ or $AEu_2X_5$, wherein A is one or more alkali metal and X is one or more halide. In some embodiments, A is selected from the group comprising K, Rb, and Cs. In some embodiments, X is selected from Cl, Br, and I. In some embodiments, the scintillation material is $K_2EuCl_4$ or $RbEu_2Cl_5$.

In some embodiments, z is 1; the alkali metal is not present; and the scintillation material comprises $L'_2BX_4$ or $L'B_2X_5$, e.g., wherein L' is Tl, In, or Na; B is one or more alkali earth metal (e.g., Be, Mg, Ca, Sr, or Ba); and X is one or more halide (e.g., F, Cl, Br, or I). In some embodiments, the scintillation material comprises or $L''_2BX_4$ or $L''B_2X_5$ wherein L" is Tl or In; B is one or more alkali earth metal; and X is one or more halide. In some embodiments, B is Sr or Ba. In some embodiments, X is Cl, Br, or I.

The scintillation material can be a single crystal, a polycrystalline material, and/or a ceramic. By "single crystal" is meant a material manufactured by a liquid phase method having few or no grain boundaries and wherein each adjoining crystal grain generally has the same orientation. In some embodiments, the material can be polycrystalline and/or ceramic and contain crystals of varying size and/or orientation.

The presently disclosed scintillation materials can have high light output, useful emission wavelength, low melting points, congruent melting, and practical crystal growth. In some embodiments, the scintillation material has a relatively low tendency to absorb water, e.g., compared to other known metal halide scintillation compounds. In some embodiments, the material is less hygroscopic than $LaBr_3$:Ce (e.g., at 25° C. and 40% relative humidity) In some embodiments, the material is less hygroscopic than NaI:Tl (e.g., at 25° C. and 40% relative humidity). In some embodiments, the material has an about 2% or less (e.g., about 2.0, 1.5, 1.0, 0.5% or less) weight change under desired conditions, such as at 25° C. and 40% relative humidity or at 25° C. and 70% relative humidity, over a period of about one hour or more.

IV. Radiation Detectors, Related Devices and Methods

In some embodiments, the presently disclosed subject matter provides a radiation detector comprising a scintillator material as described hereinabove or a mixture of such materials. The radiation detector can comprise a scintillator (which absorbs radiation and emits light) and a photodetector (which detects said emitted light). The photodetector can be any suitable detector or detectors and can be or not be optically coupled to the scintillator material for producing an electrical signal in response to emission of light from the scintillator material. Thus, the photodetector can be configured to convert photons to an electrical signal. For example, a signal amplifier can be provided to convert an output signal from a photodiode into a voltage signal. The signal amplifier can also be designed to amplify the voltage signal. Electronics associated with the photodetector can be used to shape and digitize the electronic signal.

Figure 6:
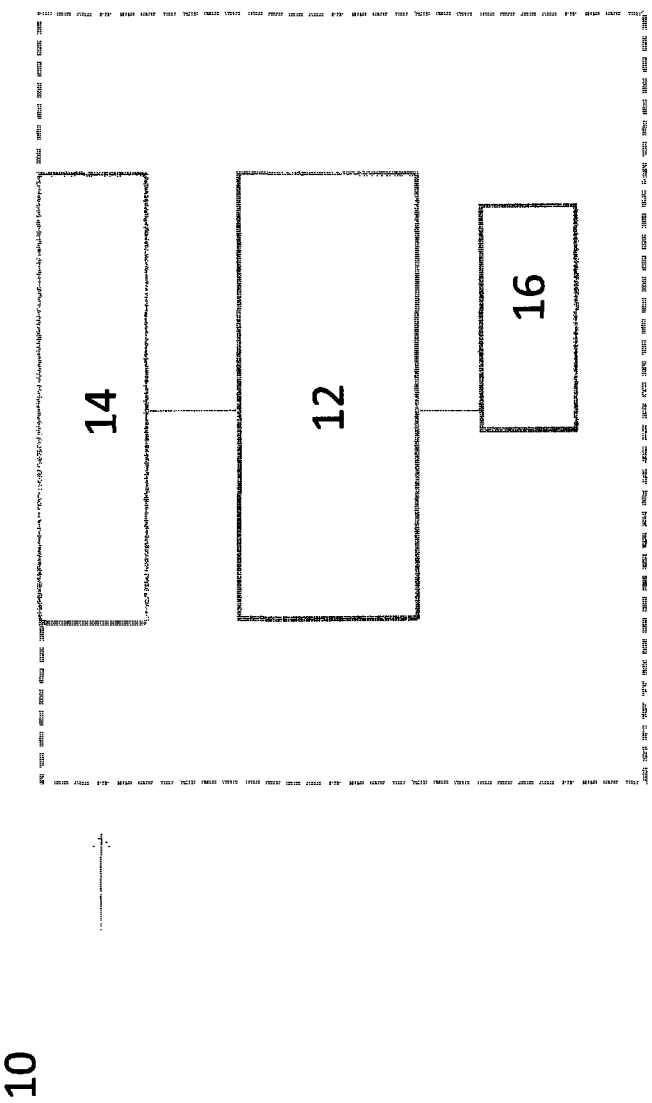
FIG. 6 is a schematic drawing of an apparatus for detecting radiation according to the presently disclosed subject matter. Apparatus 10 includes photon detector 12 optically coupled to scintillator material 14. Apparatus 10 can optionally include electronics 16 for recording and/or displaying electronic signal from photon detector 12. Thus, optional electronics 16 can be in electronic communication with photon detector 12.

Referring now to FIG. 6, in some embodiments, the presently disclosed subject matter provides an apparatus 10 for detecting radiation wherein the apparatus comprises a photon detector 12 and a scintillator material 14 (e.g., a europium-containing ternary metal halide). Scintillator material 14 can convert radiation to light that can be collected by a charge-coupled device (CCD) or a photomultiplier tube (PMT) or other photon detector 12 efficiently and at a fast rate.

Referring again to FIG. 6, photon detector 12 can be any suitable detector or detectors and can be optically coupled (e.g., via optical grease or another optical coupling compound, such as an optical coupling oil or liquid) to the scintillator (e.g., the europium containing ternary metal halide) for producing an electrical signal in response to emission of light from the scintillator. Thus, photon detector 12 can be configured to convert photons to an electrical signal. Electronics associated with photon detector 12 can be used to shape and digitize the electronic signal. Suitable photon detectors 12 include, but are not limited to, photomultiplier tubes, photodiodes, CCD sensors, and image intensifiers. Apparatus 10 can also include electronics 16 for recording and/or displaying the electronic signal.

In some embodiments, the radiation detector is configured for use as part of a medical or veterinary diagnostic device, a device for oil or other geological exploration (e.g., oil well logging probes), or as a device for security and/or military-related purposes (e.g., as a device for container, vehicle, or baggage scanning or for scanning humans or other animals). In some embodiments, the medical or veterinary diagnostic device is selected from, but not limited to, a positron emission tomography (PET) device, an X-ray computed tomography (CT) device, a single photon emission computed tomography (SPECT) device, or a planar nuclear medical imaging device. For example, the radiation detector can be configured to move (e.g., via mechanical and/or electronic controls) over and/or around a sample, such as a human or animal subject, such that it can detect radiation emitted from any desired site or sites on the sample. In some embodiments, the detector can be set or mounted on a rotating body to rotate the detector around a sample.

In some embodiments, the device can also include a radiation source. For instance, an X-ray CT device of the presently disclosed subject matter can include an X-ray source for radiating X-rays and a detector for detecting said X-rays. In some embodiments, the device can comprise a plurality of radiation detectors. The plurality of radiation detectors can be arranged, for example, in a cylindrical or other desired shape, for detecting radiation emitted from various positions on the surface of a sample.

In some embodiments, the presently disclosed subject matter provides a method for detecting radiation (or the absence of radiation) using a radiation detector comprising a europium- or other dopant-containing ternary metal halide scintillator as described hereinabove. Thus, in some embodiments, the presently disclosed subject matter provides a method of detecting gamma rays, X-rays, cosmic rays and particles having an energy of 1 keV or greater, wherein the method comprises using a radiation detector comprising a material of one of Formulas (I), (II), (IIIa), (III), (IVa) (IV), (V), (VI), (I'), (II'), (IIIa'), (III'), (IVa'), (IV'), (V'), or (VI') or a mixture of such materials.

In some embodiments, A or A' is selected from the group comprising K, Rb, and Cs. In some embodiments, B is selected from the group comprising Sr and Ba. In some embodiments, L is Eu. In some embodiments, X is selected from the group comprising Cl, Br, and I.

In some embodiments, the scintillator material comprises a material of Formula (I) or (II) and is doped with Eu and/or one or more other divalent dopants to replace between about 0.01 atomic % and about 50 atomic % of the alkali earth metal (i.e., wherein $0.0001 \le y \le 0.5$). In some embodiments, the material comprises a material of Formula (III) or (IV) and is doped with Tl, In, and/or Na to replace between about 0.01 atomic % and about 50 atomic % of the alkali metal(s) A' (i.e., wherein $0.0001 \le y \le 0.5$). In some embodiments, the material comprises a material of Formula (V) or (VI) and is doped with Tl or In to replace between about 0.01 atomic % and about 50 atomic % of the alkali metal(s) A". In some embodiments, for any of Formulas (I), (II), (IIIa), (III), (IVa), (IV), (V), or (VI), $0.01 \le y \le 0.1$. In some embodiments, $0.025 \le y \le 0.05$.

In some embodiments, the scintillator material comprises $A_2B_{0.95}Eu_{0.05}X_4$ or $AB_{2(0.975)}Eu_{2(0.025)}X_5$. In some embodiments, the scintillator material is selected from the group comprising $K_2BaI_4$:Eu 5%; $K_2BaBr_4$:Eu 5%; $Rb_2BaCl_4$:Eu 5%; $K_2SrBr_4$:Eu 5%; $Rb_2BaCl_4$:Eu 2.5%; $RbSr_2Cl_5$:Eu 2.5%; $KSr_2Br_5$:Eu 2.5%; $KBa_2I_5$:Eu 2.5%; $CsSr_2I_5$:Eu 2.5%; $RbBa_2Br_5$:Eu 2.5%; $RbSr_2Br_5$:Eu 2.5%; $KSr_2I_5$:Eu 4%; and $KSr_2I_5$:Eu 2.5%.

In some embodiments, the scintillator material comprises a material of one of Formulas (I'), (II'), (III'), (IV'), (V'), or (VI'). In some embodiments, $0.0001 \le z \le 0.5$; $0.01 \le z \le 0.1$; or $0.025 \le z \le 0.05$. Thus, in some embodiments, the material of one of Formulas (I'), (II') (III'), (IV'), (V'), or (VI') can also be a material of one of Formulas (I), (II), (III) (IV), (V), or (VI), such as, but not limited to, $K_2BaI_4$:Eu 5%; $K_2BaBr_4$: Eu 5%; $Rb_2BaCl_4$:Eu 5%; $K_2SrBr_4$:Eu 5%; $Rb_2BaCl_4$:Eu 2.5%; $RbSr_2Cl_5$:Eu 2.5%; $KSr_2Br_5$:Eu 2.5%; $KBa_2I_5$:Eu 2.5%; $CsSr_2I_5$:Eu 2.5%; $RbBa_2Br_5$:Eu 2.5%; $RbSr_2Br_5$:Eu 2.5%; $KSr_2I_5$:Eu 4%; and $KSr_2I_5$:Eu 2.5%.

In some embodiments, $0.5 < z \le 1.0$. In some embodiments, z is 1 or about 1 and about 100% of the alkali metal or alkali earth metal is replaced by an activator or dopant.

In some embodiments, the alkali earth metal is not present and the material comprises one or more alkali metal, Eu, and one or more halide. Thus, in some embodiments, the material comprises:

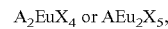

$A_2EuX_4$ or $AEu_2X_5$, wherein A is one or more alkali metal; and X is one or more halide. In some embodiments, the material is selected from the group comprising $K_2EuCl_4$ and $RbEu_2Cl_5$.

In some embodiments, the method can comprise providing a radiation detector comprising a photodetector and a scintillator material of the presently disclosed subject matter; positioning the detector, wherein the positioning comprises placing the detector in a location wherein the scintillator material is in the path of a beam of radiation (or the suspected path of a beam of radiation); and detecting light (or detecting the absence of light) emitted by the scintillator material with the photodetector. Detecting the light emitted by the scintillator material can comprise converting photons to an electrical signal. Detecting can also comprise processing the electrical signal to shape, digitize, or amplify the signal. The method can further comprise displaying the electrical signal or processed electrical signal.

In some embodiments, the presently disclosed subject matter provides a device comprising a photodetector and a scintillator material comprising a ternary metal tetra- or pentahalide comprising europium and/or one or more other dopants, such as a material of one of Formulas (I), (II), (IIIa), (III), (IVa), (IV), (V), (VI), (I'), (II'), (IIIa'), (III'), (IVa'), (IV'), (V'), and (VI') or a mixture of such materials. In some embodiments, the device comprising the photodetector and the scintillator material is adapted for use in medical imaging, geological exploration, or homeland security. In some embodiments, the presently disclosed subject matter provides a method of detecting high energy photons and particles, wherein the method comprises using the device comprising the photodetector and the scintillator material comprising a material of one of Formulas (I), (II), (IIIa), (III), (IVa), (IV), (V), (VI), (I'), (II'), (IIIa'), (III'), (IVa'), (IV'), (V'), and (VI') or a mixture of such materials.

In some embodiments, A or A' is selected from the group comprising K, Rb, and Cs. In some embodiments, B is selected from the group comprising Sr and Ba. In some embodiments, L is Eu. In some embodiments, X is selected from the group comprising Cl, Br, and I.

In some embodiments, the scintillator material is a ternary metal halide doped with Eu and/or one or more other divalent dopants (e.g., Ce, Tb, Yb, and/or Pr) to replace between about 0.01 atomic % and about 50 atomic % of the alkali earth metal(s) (i.e., wherein $0.0001 \leq y \leq 0.5$ or $0.0001 \leq z \leq 0.5$). In some embodiments, the material comprises a ternary metal halide doped with Tl, In, and/or Na to replace between about 0.01 atomic % and about 50 atomic % of the alkali metal(s) A' (i.e., wherein $0.0001 \leq y \leq 0.5$ or $0.0001 \leq z \leq 0.5$). In some embodiments, the material comprises a ternary metal halide doped with Tl and/or In to replace between about 0.01 atomic % and about 50 atomic % of the alkali metal(s) A" (i.e., wherein $0.0001 \leq y \leq 0.5$ or $0.0001 \leq z \leq 0.5$). In some embodiments, for any of Formulas (I), (II), (IIIa), (III), (IVa), (IV), (V), (VI), (I'), (II'), (IIIa'), (III'), (IVa'), (IV'), (V'), and/or (VI'), $0.01 \leq y \leq 0.1$ or $0.01 \leq z \leq 0.1$. In some embodiments, $0.025 \leq y \leq 0.05$ or $0.025 \leq z \leq 0.05$.

In some embodiments, the material comprises $A_2B_{0.95}Eu_{0.05}X_4$ or $AB_{2(0.975)}Eu_{2(0.025)}X_5$. In some embodiments, the material is selected from the group comprising $K_2BaI_4$:Eu 5%; $K_2BaBr_4$:Eu 5%; $Rb_2BaCl_4$:Eu 5%; $K_2SrBr_4$:Eu 5%; $Rb_2BaCl_4$:Eu 2.5%; $RbSr_2Cl_5$:Eu 2.5%; $KSr_2Br_5$:Eu 2.5%; $KBa_2I_5$:Eu 2.5%; $CsSr_2I_5$:Eu 2.5%; $RbBa_2Br_5$:Eu 2.5%; $RbSr_2Br_5$:Eu 2.5%; $KSr_2I_5$:Eu 4%; and $KSr_2I_5$:Eu 2.5%.

In some embodiments, the scintillator material comprises a material of one of Formulas (I'), (II'), (IIIa'), (III'), (IVa'), (IV'), (V'), and (VI') and $0.5 < z \leq 1.0$. In some embodiments, z is 1 or about 1 and about 100% of the alkali metal or alkali earth metal is replaced by an activator or dopant.

In some embodiments, the alkali earth metal is not present and the material comprises one or more alkali metal, Eu, and one or more halide. Thus, in some embodiments, the material comprises:

$A_2EuX_4$ or $AEu_2X_5$, wherein A is one or more alkali metal; and X is one or more halide. In some embodiments, the material is selected from the group comprising $K_2EuCl_4$ and $RbEu_2Cl_5$.

V. Methods of Preparation

The presently disclosed scintillation materials can be prepared via any suitable method. Typically, the appropriate reactants (e.g., metal halides, such as, but not limited to CsBr, NaBr, CsI, NaI, $SrI_2$, $BaI_2$, $EuBr_2$, and the like) are melted at a temperature sufficient to form a congruent, molten composition. The melting temperature will depend on the identity of the reactants themselves (e.g., on the melting points of the individual reactants), but is usually in the range of from about 300° C. to about 1350° C. Exemplary techniques for preparing the materials include, but are not limited to, the Bridgman or Bridgman-Stockbarger method, the Czochralski method, the zone-melting method (or "floating zone" method), the vertical gradient freeze (VGF) method, and temperature gradient methods.

For instance, in some embodiments, high purity reactants can be mixed and melted to synthesize a compound of the desired composition. A single crystal or polycrystalline material can be grown from the synthesized compound by the Bridgman method, in which a sealed ampoule containing the synthesized compound is transported from a hot zone to a cold zone through a controlled temperature gradient at a controlled speed. In some embodiments, high purity reactants can be mixed in stoichiometric ratios depending upon the desired composition of the scintillator material and loaded into an ampoule, which is then sealed. After sealing, the ampoule is heated and then cooled at a controlled speed.

In some embodiments, the presently disclosed subject matter provides a method of preparing a scintillation material comprising an europium- and/or other dopant-containing ternary metal tetra- or pentahalide. In some embodiments, the method comprises heating a mixture of raw materials (e.g., a mixture of metal halides in a stoichiometric ratio depending upon the formula of the desired scintillation material) above their respective melting temperatures (i.e., above the melting temperature of the raw material with the highest melting temperature). In some embodiments, the raw materials are dried prior to, during, or after mixing. In some embodiments, the raw materials are mixed under low humidity and/or low oxygen conditions. In some embodiments, the raw materials are mixed in a dry box and/or under conditions of less than about 0.1 parts-per-million (ppm) moisture and/or oxygen (e.g., less than about 0.1 ppm, 0.09 ppm, 0.08 ppm, 0.07 ppm, 0.06 ppm, 0.05 ppm, 0.04 ppm, 0.03 ppm, 0.02 ppm, or less than 0.01 ppm moisture and/or oxygen).

The mixture of raw materials can be sealed in a container (e.g., a quartz ampoule) that can withstand the subsequent heating of the mixture and which is chemically inert to the mixture of raw materials. The mixture can be heated at a predetermined rate to a temperature above the melting temperature of the individual raw materials. In some embodiments, the mixture can be heated to a temperature that is between about 10° C. and about 40° C. (e.g., about 10, 12, 14, 16, 18, 20, 22, 24, 26, 28, 30, 32, 34, 36, 38, or about 40° C.) above the melting temperature of the raw material with the highest melting temperature. In some embodiments, the mixture is heated to about 20° C. above the melting temperature of the raw material with the highest melting temperature. This temperature can be maintained for a period of time, such as between about 2 and about 12 hours (e.g., about 2, 3, 4, 5, 6, 7, 8, 9, 10, 11, or about 12 hours).

Then the mixture can be cooled at a predetermined rate until the mixture reaches about room temperature (e.g., between about 20° C. and about 25° C.). If desired, the sealed container can be rotated or inverted. Then the heating and cooling can be repeated, e.g., to provide further mixing of all of the components in the mixture. The rotating or inverting and heating/cooling steps can be repeated one or more additional times, as desired.

Accordingly, in some embodiments, the method comprises:

(a) providing a mixture of raw materials, wherein the raw materials are provided in a stoichiometric ratio according to one of Formulas (I), (II), (IIIa), (III), (IVa), (IV), (V), (VI), (I'), (II'), (IIIa'), (III'), (IVa'), (IV'), (V'), and (VI');

(b) sealing said mixture in a sealed container;

(c) heating the mixture to about 20° C. above the melting point of the raw material having the highest melting point for a period of time;

(d) cooling the mixture to about room temperature; and (e) optionally repeating steps (c) and (d).

In some embodiments, steps (c) and (d) are repeated one or more times.

In some embodiments, the scintillation material comprises one of Formulas (I), (II), (III), (IV) (V), or (VI). In some embodiments, A or A' is selected from the group comprising K, Rb, and Cs. In some embodiments, B is selected from the group comprising Sr and Ba. In some embodiments, L is Eu. In some embodiments, X is selected from the group comprising Cl, Br, and I.

In some embodiments, the material comprises at least one alkali earth metal B and is doped with Eu and/or one or more other divalent dopants (e.g., Ce, Tb, Yb, and/or Pr). In some embodiments, the material is a one of Formulas (I) or (II). In some embodiments $0.01 \leq y \leq 0.1$. In some embodiments, $0.025 \leq y \leq 0.05$.

In some embodiments, the scintillation material comprises $A_2B_{0.95}Eu_{0.05}X_4$ or $AB_{2(0.975)}Eu_{2(0.025)}X_5$. In some embodiments, the scintillation material is selected from the group comprising $K_2BaI_4$:Eu 5%; $K_2BaBr_4$:Eu 5%; $Rb_2BaCl_4$:Eu 5%; $K_2SrBr_4$:Eu 5%; $Rb_2BaCl_4$:Eu 2.5%; $RbSr_2Cl_5$:Eu 2.5%; $KSr_2Br_5$:Eu 2.5%; $KBa_2I_5$:Eu 2.5%; $CsSr_2I_5$:Eu 2.5%; $RbBa_2Br_5$:Eu 2.5%; $RbSr_2Br_5$:Eu 2.5%; $KSr_2I_5$:Eu 4%; and $KSr_2I_5$:Eu 2.5%.

In some embodiments, the alkali earth metal is not present (i.e., z is 1 in one of Formulas (I') or (II')) and the scintillation material comprises one or more alkali metal, Eu, and one or more halide. Thus, in some embodiments, the scintillation material can comprise:

$A_2EuX_4$ or $AEu_2X_5$, wherein A is one or more alkali metal; and X is one or more halide. In some embodiments, the scintillation material can be selected from the group comprising $K_2EuCl_4$ and $RbEu_2Cl_5$.

The scintillation materials can be provided as single crystals, as a polycrystalline material, and/or as a ceramic material. In some embodiments, the material is provided as a polycrystalline material. The polycrystalline material can have analogous physical, optical and scintillation properties as a single crystal otherwise having the same chemical composition.

EXAMPLES

The following Examples have been included to provide guidance to one of ordinary skill in the art for practicing representative embodiments of the presently disclosed subject matter. In light of the present disclosure and the general level of skill in the art, those of skill can appreciate that the following Examples are intended to be exemplary only and that numerous changes, modifications, and alterations can be employed without departing from the scope of the presently disclosed subject matter.

Example 1

Preparation of Scintillator Materials

Anhydrous high purity raw materials (e.g., CsBr, NaBr, CsI, NaI, $SrI_2$, $BaI_2$, $EuBr_2$, and the like) from Sigma-Aldrich (St. Louis, Mo., United States of America) were mixed and loaded into 8 millimeter (mm) diameter quartz ampoules, inside a dry box containing less than 0.01 ppm moisture and oxygen, and in stoichiometric ratios according to the chemical formulas of the respective compounds. The mixed raw materials were dried in the ampoules under 10-6 torr vacuum at 200° C. for 4 hours. As soon as the loaded ampoules reached room temperature, they were sealed with a hydrogen torch. A single zone clamshell furnace was used to melt-synthesize 4 gram (g) samples of the compounds: $A_2B_{0.95}Eu_{0.05}X_4$ (A=K or Rb; B=Sr or Ba; and X=Cl, Br, or I) and $AB_{2(0.975)}Eu_{2(0.025)}X_5$ (A=K, Rb, or Cs; B=Sr or Ba; and X=Cl, Br, or I). The temperature was slowly raised to about 20° C. above the melting points of all the components. This temperature was held for 7 hours and slowly brought down to room temperature (over a period of about 7 hours). The ampoule was inverted and the procedure was repeated to encourage complete mixing of all consituents. The result was a polycrystalline sample with analogous physical, optical and scintillation properties of a grown single crystal.

The phase diagrams of $KBr-SrBr_2$, $KBr-BaBr_2$, and $KCl-EuCl_4$ have been previously reported. See Kellner (1917); Riccardi et al. (1970); and Korshunov et al. (1966). The phase diagrams show the formation of congruent melting compounds of the formula $K_2BX_4$ wherein B is Sr, Ba, or Eu and X is Br or Cl at 600° C., 632° C., and 605° C., respectively. See Kellner (1917); Riccardi et al. (1970); and Korshunov et al. (1966). $K_2EuCl_4$ has a density of 3.2 g/cm³ and tetrahedral crystal structure. See Fink and Seifert (1980). Table 1, below, displays some of the physical properties of the base ternary metal pentahalide compounds (i.e., the $AB_2X_5$ compounds without europium doping) of the presently disclosed subject matter. Although some of the non-europium doped compounds were previously known, they were not previously known as scintillators.

TABLE 1

Physical Properties of $AB_2X_5$ Compounds.

| Compound | Melting Point (° C.) | Crystal Structure at room temperature | Density (g/cm³) | Hygroscopcity |
|---|---|---|---|---|
| $RbSr_2Cl_5$ | 634$^a$ | orthorhombic$^e$ | 3.20$^e$ | slightly |
| $KSr_2Br_5$ | 572$^b$ | monoclinic$^e$ | 3.98$^e$ | slightly |
| $KBa_2I_5$ | NI | monoclinic$^e$ | 4.52$^e$ | slightly |
| $CsSr_2I_5$ | NI | monoclinic$^c$ | 4.64$^e$ | very |
| $RbEu_2Cl_5$ | 663$^c$ | monoclinic$^c$ | 4.20$^c$ | slightly |

TABLE 1-continued

Physical Properties of AB$_2$X$_5$ Compounds.

| Compound | Melting Point (° C.) | Crystal Structure at room temperature | Density (g/cm$^3$) | Hygroscopcity |
|---|---|---|---|---|
| RbBa$_2$Br$_5$ | NI | monoclinic[e] | 4.37[e] | slightly |
| RbSr$_2$Br$_5$ | 596[d] | monoclinic[e] | 4.18[e] | slightly |
| KSr$_2$I$_5$ | NI | monoclinic[e] | 4.39[e] | very |

NI = no information found in the literature;
[a]data from Bukhalova et al. (1967);
[b]data from Kellner (1917);
[c]data from Fink and Seifert (1980);
[d]data from Riccardi et al. (1970);
[e]data from Schilling et al. (1996)

Example 2

Moisture Absorption of Scintillator Materials

The tendency for a scintillation material to absorb moisture can sometimes be a limitation to its practical application as a radiation detector. Moisture absorption of the scintillation materials was studied at 25° C. using approximately 32 mg amounts of the scintillation materials under conditions of 40% relative humidity. FIG. 1 shows the moisture uptake over time of several of the presently disclosed scintillation materials. For comparison, the moisture uptake is also provided for two commonly used metal halide scintillation materials, i.e., NaI:Tl and LaBr$_3$:Ce 5%. RbSr$_2$Cl$_5$:Eu 2.5%, K$_2$BaBr$_4$:Eu 5%, KBa$_2$I$_5$:Eu 2.5%, and K$_2$BaI$_4$:Eu 5% were less hygroscopic than NaI:Tl. KSr$_2$Br$_5$:Eu 2.5%, K$_2$SrBr$_4$: Eu 5% and CsSr$_2$I$_5$:Eu 2.5% had moisture uptake between that of LaBr$_3$:Ce 5% and NaI:Tl.

Example 3

Moisture Absorption of Scintillator Materials

Photoluminescence spectra of the presently disclosed scintillation materials were acquired using a Hitachi Fluorescence Spectrophotometer (Hitachi High-Tech Science Corporation, Tokyo, Japan) equipped with a Xenon lamp at room temperature. The photoluminescence spectra (see FIGS. 2A-2M) are characteristic of divalent Eu luminescence, which completely involves 4f-5d excited states.

Radioluminescence spectra were measured at room temperature under continuous irradiation from a Source 1 X-ray generator model CMX003 (32 kV and 0.1 mA; Source 1 X-Ray, Campbell, Calif., United States of America). A model PI Acton Spectra Pro SP-2155 monochromator (Princeton Instruments, Trenton, N.J., United States of America) was used to record the spectra. The single peak emission observed in the radioluminescence spectra shown in FIGS. 3A-3M can be attributed to characteristic emission of Eu$^{2+}$ 5d to 4f transitions, which confirm that Eu ions enter the metal halide lattice in divalent form.

Absolute light output measurements for the presently disclosed scintillator materials are shown in FIGS. 4A-4M. A Hamamatsu 3177-50 photomultiplier tube (PMT; Hamamatsu Photonics, K.K.; Hamamatsu, Japan) was used. Gamma-ray energy spectra were recorded using $^{137}$Cs as an excitation source. The measurements were done with the samples covered and directly coupled to the PMT with mineral oil. A SPECTRALON™ (Labsphere, Inc., North Sutton, N.H., United States of America) dome was used as a reflector. Spectra shown in FIGS. 4A-4M exhibit the position of the 662 keV gamma-ray photopeak at much higher channel number than the reference bismuth germinate (BGO) crystal with its photopeak at channel 100. The photopeaks were fitted with a Gaussian function to determine the centroid of the peak. The integral quantum efficiency of the PMT according to the emission spectrum of the scintillator was used to estimate the light output in photons per unit of gamma-ray energy.

The scintillation properties of the presently disclosed ternary metal halides are summarized in Tables 2 and 3 below. Scintillation decay time was recorded using a $^{137}$Cs source and a time-correlated single photon counting technique. See Bollinger and Thomas (1961). Scintillation decay curves (fitted with an exponential decay function) for the presently disclosed materials are shown in FIGS. 5A-5M.

TABLE 2

Scintillation properties of compounds of formula A$_2$B$_{(1-y)}$Eu$_y$X$_4$.

| Composition | LO (ph/MeV) | Maximum RL (nm) | Scintillation decay (μs) |
|---|---|---|---|
| K$_2$EuCl$_4$ | 23000 | 475 | 0.6 (~66%), 3.2 (~25), 0.1 |
| K$_2$BaI$_4$: Eu 5% | 50000 | 449 | 0.9 (~68%), 4.2 |
| K$_2$BaBr$_4$: Eu 5% | 41000 | 430 | 0.7 (~86%), 2.8 |
| Rb$_2$BaCl$_4$: Eu 5% | 18000 | 436 | 0.7 (~70%), 3.3 |
| K$_2$SrBr$_4$: Eu 5% | 20000 | 445 | 0.8 (~97%), 2 |

TABLE 3

Scintillation properties of compounds of formula AB$_{2(1-y)}$Eu$_{2y}$X$_5$.

| Composition | LO (ph/MeV) | Maximum RL (nm) | Scintillation decay (μs) |
|---|---|---|---|
| RbSr$_2$Cl$_5$: Eu 2.5% | 32000 | 426 | 0.9 (~67%), 1.4 |
| KSr$_2$Br$_5$: Eu 2.5% | 50000 | 427 | 0.9 (~92%), 2.6 |
| KBa$_2$I$_5$: Eu 2.5% | 56000 | 442 | 0.9 (~79%), 4.9 |
| CsSr$_2$I$_5$: Eu 2.5% | 50000 | 441 | 0.9 (~68%), 4 |
| RbEu$_2$Cl$_5$: Eu 2.5% | 30000 | 440 | 1.8 |
| RbBa$_2$Br$_5$: Eu 2.5% | 29000 | 425 | 0.8 (~76%), 3 |
| RbSr$_2$Br$_5$: Eu 2.5% | 33000 | 430 | 0.8 |
| KSr$_2$I$_5$: Eu 4% | 81000 | 452 | 0.8 |

REFERENCES

The references listed below as well as all references cited in the specification including, but not limited to, patents, patent application publications, and journal articles are incorporated herein by reference to the extent that they supplement, explain, provide a background for, or teach methodology, techniques, and/or compositions employed herein.

Bollinger, L. M., and Thomas, G. E.; Review of Scientific Instruments, 32, 1044-1050 (1961).

Bukhalova, G. A., and Burlakova, V. M.; Russ. J. Inorg. Chem., 12, 703-705 (1967).

Fink, H., and Seifert, H.-J.; Anorg. Allg. Chem., 466, 87-96 (1980).

Kellner, Z.; Anorg. Allg. Chem., 99, 137-183 (1917).

Korshunov, D. V., et al.; Russ. J. Inorg. Chem., 11, 547-550 (1966).

Riccardi, R., et al.; Z. Naturforsch, A: Astrophys., Phys. Phys. Chem., 25, 781-785 (1970);

Schilling, G., and Meyer, G.; Z. Anorg. Allg. Chem., 622, 759-765 (1996).

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A scintillator material comprising one of Formulas (I), (III), (IV), (V), or (VI):

$$A_2B_{(1-y)}L_yX_4 \quad (I);$$

$$A'_{2(1-y)}L'_{2y}BX_4 \quad (III);$$

$$A'_{(1-y)}L'_yB_2X_5 \quad (IV);$$

$$A''_{2(1-y)}L''_{2y}BX_4 \quad (V); \text{ or}$$

$$A''_{(1-y)}L''_yB_2X_5 \quad (VI);$$

wherein:
0.0001≤y≤0.5;
A is one or more alkali metal;
A' is one or more of the group consisting of Li, K, Rb, and Cs;
A" is Na or a combination of Na and one or more additional alkali metal;
B is one or more alkali earth metal;
L is selected from the group consisting of Eu, Ce, Tb, Yb, and Pr;
L' is selected from the group consisting of Tl, In, and Na;
L" is selected from the group consisting of Tl and In; and
X is one or more halide.

2. The scintillator material of claim 1, wherein A or A' is selected from K, Rb, and Cs.

3. The scintillator material of claim 1, wherein B is selected from Sr and Ba.

4. The scintillator material of claim 1, wherein X is selected from Cl, Br, and I.

5. The scintillator material of claim 1, wherein L is Eu and the scintillator material comprises $A_2B_{(1-y)}Eu_yX_4$.

6. The scintillator material of claim 1, wherein 0.01≤y≤0.1.

7. The scintillator material of claim 6, wherein 0.025≤y≤1.05.

8. The scintillator material of claim 7, comprising $A_2B_{0.95}Eu_{0.05}X_4$.

9. The scintillator material of claim 7, wherein the scintillator material is selected from the group consisting of $K_2BaI_4$:Eu 5%; $K_2BaBr_4$:Eu 5%; $Rb_2BaCl_4$:Eu 5%; $K_2SrBr_4$:Eu 5%; and $Rb_2BaCl_4$:Eu 2.5%.

10. A radiation detector comprising a photon detector and a scintillation material, wherein the scintillation material comprises a scintillator material of claim 1.

11. The radiation detector of claim 10, wherein the detector is a medical diagnostic device, a device for oil exploration, or a device for container or baggage scanning.

12. A method of detecting gamma rays, X-rays, cosmic rays, and/or particles having an energy of 1 keV or greater, the method comprising using the radiation detector of claim 10.

13. A method of preparing a scintillator material of claim 1, wherein the method comprises heating a mixture of raw materials above their respective melting temperatures.

14. The method of claim 13, wherein the method comprises:

(a) providing a mixture of raw materials, wherein the raw materials are provided in a stoichiometric ratio according to one of Formulas (I), (III), (IV), (V), or (VI);
(b) sealing said mixture in a sealed container;
(c) heating the mixture to about 20° C. above the melting point of the raw material having the highest melting point for a period of time;
(d) cooling the mixture to about room temperature; and
(e) optionally repeating steps (c) and (d).

15. The method of claim 13, wherein the scintillator material is prepared in polycrystalline form.

16. A radiation detector comprising a photon detector and a scintillation material, wherein the scintillation material comprises one of Formulas (I'), (III'), (IV'), (V'), or (VI'):

$$A_2B_{(1-z)}L_zX_4 \quad (I');$$

$$A'_{2(1-z)}L'_{2z}BX_4 \quad (III');$$

$$A'_{(1-z)}L'_zB_2X_5 \quad (IV');$$

$$A''_{2(1-z)}L''_{2z}BX_4 \quad (V'); \text{ or}$$

$$A''_{(1-z)}L''_zB_2X_5 \quad (VI');$$

wherein:
0.0001≤z≤1.0;
A is one or more alkali metal;
A' is one or more of the group consisting of Li, K, Rb, and Cs;
A" is Na or a combination of Na and one or more additional alkali metal;
B is one or more alkali earth metal;
L is selected from the group consisting of Eu, Ce, Tb, Yb, and Pr;
L' is selected from the group consisting of Tl, In, and Na;
L" is selected from the group consisting of Tl and In; and
X is one or more halide.

17. The radiation detector of claim 16, wherein A or A' is selected from K, Rb, and Cs.

18. The radiation detector of claim 16, wherein B is selected from Sr and Ba.

19. The radiation detector of claim 16, wherein X is selected from Cl, Br, and I.

20. The radiation detector of claim 16, wherein L is Eu and the scintillator material comprises $A_2B_{(1-z)}Eu_zX_4$.

21. The radiation detector of claim 16, wherein 0.01≤z≤0.1.

22. The radiation detector of claim 16, wherein 0.025≤z≤0.05.

23. The radiation detector of claim 16, wherein the scintillation material comprises $A_2B_{0.95}Eu_{0.05}X_4$.

24. The radiation detector of claim 16, wherein the scintillation material is selected from the group consisting of $K_2BaI_4$:Eu 5%; $K_2BaBr_4$:Eu 5%; $Rb_2BaCl_4$:Eu 5%; $K_2SrBr_4$:Eu 5%; and $Rb_2BaCl_4$:Eu 2.5%.

25. The radiation detector of claim 16, wherein z is 1.

26. The radiation detector of claim 25, wherein the scintillation material is $K_2EuCl_4$.

27. The radiation detector of claim 16, wherein the detector is a medical diagnostic device, a device for oil exploration, or a device for container or baggage scanning.

28. A method of detecting gamma rays, X-rays, cosmic rays, and/or particles having an energy of 1 keV or greater, the method comprising using the radiation detector of claim 16.

29. A scintillator material comprising Formula (II):

$$AB_{2(1-y)}L_{2y}X_5 \quad \quad (II),$$

wherein:
$0.0001 \leq y \leq 0.5$;
A is one or more alkali metal, optionally wherein A is selected from K, Rb, and Cs;
B is one or more alkali earth metal;
L is selected from the group consisting of Eu, Ce, Tb, Yb, and Pr;
and
X is one or more halide selected from F, Cl, and Br, optionally wherein X is selected from Cl and Br.

30. The scintillator material of claim 29, wherein L is Eu and the scintillator material comprises $AB_{2(1-y)}Eu_{2y}X_5$.

31. The scintillator material of claim 29, wherein $0.01 \leq y \leq 0.1$; optionally wherein $0.025 \leq y \leq 1.05$; optionally wherein the scintillator material comprises $AB_{2(0.975)}Eu_{2(0.025)}X_5$; optionally wherein the scintillator material is selected from the group consisting of $RbSr_2Cl_5$:Eu 2.5%; $KSr_2Br_5$:Eu 2.5%; $RbBa_2Br_5$:Eu 2.5%; and $RbSr_2Br_5$:Eu 2.5%.

32. The scintillator material of claim 29, wherein B is selected from Sr and Ba.

33. A radiation detector comprising a photon detector and a scintillation material, wherein the scintillation material comprises a scintillator material of claim 29.

34. A method of preparing a scintillator material of claim 29, wherein the method comprises heating a mixture of raw materials above their respective melting temperatures.

35. The method of claim 34, wherein the method comprises:
(a) providing a mixture of raw materials, wherein the raw materials are provided in a stoichiometric ratio according to Formula (II);
(b) sealing said mixture in a sealed container;
(c) heating the mixture to about 20° C. above the melting point of the raw material having the highest melting point for a period of time;
(d) cooling the mixture to about room temperature; and
(e) optionally repeating steps (c) and (d).

36. A scintillator material selected from the group consisting of $KBa_2I_5$:Eu 2.5%; $CsSr_2I_5$:Eu 2.5%; $KSr_2I_5$:Eu 4%; and $KSr_2I_5$:Eu 2.5%.

37. A radiation detector comprising a photon detector and a scintillation material, wherein the scintillation material comprises a scintillator material of claim 36.

38. A method of preparing a scintillator material of claim 36, wherein the method comprises heating a mixture of raw materials above their respective melting temperatures.

39. The method of claim 38, wherein the method comprises:
(a) providing a mixture of raw materials, wherein the raw materials are provided in a stoichiometric ratio according to a formula selected from the group consisting of $KBa_2I_5$:Eu 2.5%; $CsSr_2I_5$:Eu 2.5%; $KSr_2I_5$:Eu 4%; and $KSr_2I_5$:Eu 2.5%;
(b) sealing said mixture in a sealed container;
(c) heating the mixture to about 20° C. above the melting point of the raw material having the highest melting point for a period of time;
(d) cooling the mixture to about room temperature; and
(e) optionally repeating steps (c) and (d).

40. A radiation detector comprising a photon detector and a scintillation material, wherein the scintillation material comprises Formula (II'):

$$AB_{2(1-z)}L_{2z}X_5 \quad \quad (II'),$$

wherein:
$0.0001 \leq z \leq 1.0$;
A is one or more alkali metal, optionally selected from K, Rb, and Cs;
B is one or more alkali earth metal;
L is selected from the group consisting of Eu, Ce, Tb, Yb, and Pr;
and
X is one or more halide selected from the group F, Cl, and Br, optionally selected from Cl and Br.

41. The radiation detector of claim 40, wherein L is Eu and the scintillator material comprises $AB_{2(1-z)}Eu_{2z}X_5$.

42. The radiation detector of claim 40, wherein the scintillation material comprises $AB_{2(0.975)}Eu_{2(0.025)}X_5$, optionally wherein the scintillation material is selected from the group consisting of $RbSr_2Cl_5$:Eu 2.5%; $KSr_2Br_5$:Eu 2.5%; $RbBa_2Br_5$:Eu 2.5%; and $RbSr_2Br_5$:Eu 2.5%.

43. The radiation detector of claim 40, wherein the scintillation material is $RbEu_2Cl_5$.

44. The radiation detector of claim 40, wherein B is selected from Sr and Ba.

45. The radiation detector of claim 40, wherein $0.01 \leq z \leq 0.1$.

46. The radiation detector of claim 40, wherein $0.025 \leq z \leq 0.05$.

47. The radiation detector of claim 40, wherein the detector is a medical diagnostic device, a device for oil exploration, or a device for container or baggage scanning.

48. A method of detecting gamma rays, X-rays, cosmic rays, and/or particles having an energy of 1 keV or greater, the method comprising using the radiation detector of claim 40.

* * * * *